United States Patent
Kruger et al.

(10) Patent No.: US 7,546,605 B1
(45) Date of Patent: Jun. 9, 2009

(54) MANAGEMENT OF NON-MBEAM OBJECTS IN JMX ENVIRONMENT

(75) Inventors: Stephen Kruger, Grenoble (FR); Daniel Lutoff, Saint Martin d'Hères (FR); Georgia Panagopoulou, Athens (GR); Simon Vienot, Crolles (FR)

(73) Assignee: Sun Microsystems, Inc., Santa Clara, CA (US)

( * ) Notice: Subject to any disclaimer, the term of this patent is extended or adjusted under 35 U.S.C. 154(b) by 1060 days.

(21) Appl. No.: 10/276,481

(22) PCT Filed: Jun. 13, 2000

(86) PCT No.: PCT/IB00/00784
§ 371 (c)(1), (2), (4) Date: Aug. 15, 2003

(87) PCT Pub. No.: WO00/77632
PCT Pub. Date: Dec. 21, 2000

(30) Foreign Application Priority Data
Jun. 15, 1999 (FR) ................................... 99 07583

(51) Int. Cl.
G06F 13/00 (2006.01)
(52) U.S. Cl. ...................................... 719/316; 719/328
(58) Field of Classification Search ................. 719/316, 719/328
See application file for complete search history.

(56) References Cited

U.S. PATENT DOCUMENTS

| 6,061,721 | A  | * | 5/2000  | Ismael et al. | 709/223 |
| 6,078,743 | A  | * | 6/2000  | Apte et al.   | 717/100 |
| 6,298,478 | B1 | * | 10/2001 | Nally et al.  | 717/170 |
| 6,415,334 | B1 | * | 7/2002  | Kanamori      | 719/316 |
| 6,438,744 | B2 | * | 8/2002  | Toutonghi et al. | 717/137 |
| 6,539,383 | B2 | * | 3/2003  | Charlet et al. | 707/10 |
| 6,874,020 | B1 | * | 3/2005  | Da Palma et al. | 709/223 |
| 7,099,931 | B2 | * | 8/2006  | Da Palma et al. | 709/220 |

FOREIGN PATENT DOCUMENTS

EP          0909057          4/1999

OTHER PUBLICATIONS

"Dynamic Management for the Service Age"; Java Management Extensions White Paper; Jun. 1, 1999; Internet; Sun Microsystems; Retrieved on Nov. 8, 2000.

(Continued)

*Primary Examiner*—Andy Ho
(74) *Attorney, Agent, or Firm*—Robert C. Kowert; Meyertons, Hood, Kivlin, Kowert & Goetzel, P.C.

(57) ABSTRACT

The invention is applied in a software management system. It comprises an MBean server (2100) which enables the management of Java object e.g. Dynamic MBean by introspecting the Dynamic MBean and providing the result of the introspection in an MbeanInfo object (3108). The invention permits to manage non-MBean object (3106) via the MBean server (2100) and a new object called Automanager (3105). The automanager (3105) inherits the specificities of a Dynamic MBean by implementing a Dynamic MBean interface (3107). Moreover, the Automanager (3105) receives the non-MBean object (3106) as parameter in its constructor. Thus, all management possibilities of a Dynamic MBean are retrieved to render the non-MBean object manageable.

50 Claims, 13 Drawing Sheets

OTHER PUBLICATIONS

International Search Report in application No. PCT/IB00/00784 mailed Nov. 24, 2000.

Orfali R., et al.; "Client/Server with Distributed Objects"; Article; BYTE vol. 20, NO. 4; McGraw-Hill; St. Petersburg; Apr. 1, 1995.

"CORBA: Integrating Diverse Applications Within Distributed Heterogeneous Environments"; Article; IEEE Communications Magazine vol. 35, No. 2; IEEE Service Center; Piscataway, NJ; Feb. 1, 1997.

* cited by examiner

Registration phase

De-registration phase

MANAGEMENT OF NON-MBEAM OBJECTS IN JMX ENVIRONMENT

This invention relates to computer technology, more particularly to the management of computer software.

The Java Dynamic Management Kit (JDMK) is an embodiment of the Java Management Extensions (JMX specification). Details may be found at protocol (http://), domain (java(dot)sun(dot)com/products/JavaManagement/)

about Java Management Extensions, a management standards specification initiated by Sun Microsystems. The JDMK proposals incorporate technology for managing objects which obey certain rules and principles. These rules and principles are derived from the Java Bean specifications, with further constraints to allow their management in a networked environment. Objects conforming to the JMX specification are called managed beans ("MBeans").

Objects using JDMK can be managed only if they comply with the JMX specification, i.e. qualify as MBean objects. Other objects (non-MBean objects) cannot be managed. This may be a problem in certain circumstances, e.g. where coexistence between MBean objects and non-MBean objects is required.

A general aim of the present invention is to bring a solution to this problem.

A first object of this invention is to extend the JDMK technology, with a view to allow management of non-MBean objects, basically rendering any java object manageable by JDMK, even if it does not explicitly implement an MBean management interface.

Another object of this invention is to offer most or all of the advantages of JDMK management (remote management, over RMI, HTTP, HTTPS, SNMP, etc) to individuals using Java objects without such individuals having to instrument anything to be specifically JDMK MBean compliant.

The invention is applicable in an object orientated software environment, comprising an object processor, management functionalities, at least one dynamically manageable object, (e.g a dynamic MBean) and a non manageable object, (e.g a non-MBean object) also called given object, with public methods. In accordance with this invention, the dynamically manageable object provides public methods which represent public methods of the given object exposed in a management interface, in order to wrap the given object and to render it manageable.

In another aspect of this invention, the dynamically manage-able object may be arranged for storing a list of certain of the public methods of the given object.

These public methods may comprise attribute reading and/or writing public methods, determined using naming conventions. These naming conventions may comprise design patterns described hereinafter in more details.

More specifically, the public methods of the given object may be registrable in data structures, defined as management information classes ("MbeanAttributeInfo" for example). By containing these attribute-related public methods, these management information classes render the given object manageable.

In an embodiment of the invention, the dynamically manageable object has a public method to provide a management information class (MBeanInfo class) exposing the public methods of the given object. In other words, a selected public method is capable of exposing the management interface of the given object.

This selected public method is also capable of returning the exposed management interface to the management functionalities. These management functionalities may comprise a managed object server.

The managed object server may receive management requests translated for execution on the given object. The management requests comprises requests for managing the attribute-related public methods of the given object.

The invention specifies also a method of managing the non manageable object and a software code for managing this object, both method and software code in accordance with the above defined features of the invention.

The invention also encompasses:

a computer, comprising:
    the above defined object orientated software environment, and
    a managed object server, or MBean server, capable of registering objects having a management interface, for serving management applications,
    optionally, at least one link to a management application.

a computer, capable of hosting at least one such machine as a virtual machine.

a computer network, comprising a plurality of interconnected computers, wherein at least one of the computers is a computer as above defined.

Other alternative features and advantages of the invention will appear in the detailed description below and in the appended drawings, in which.

Figure 1:
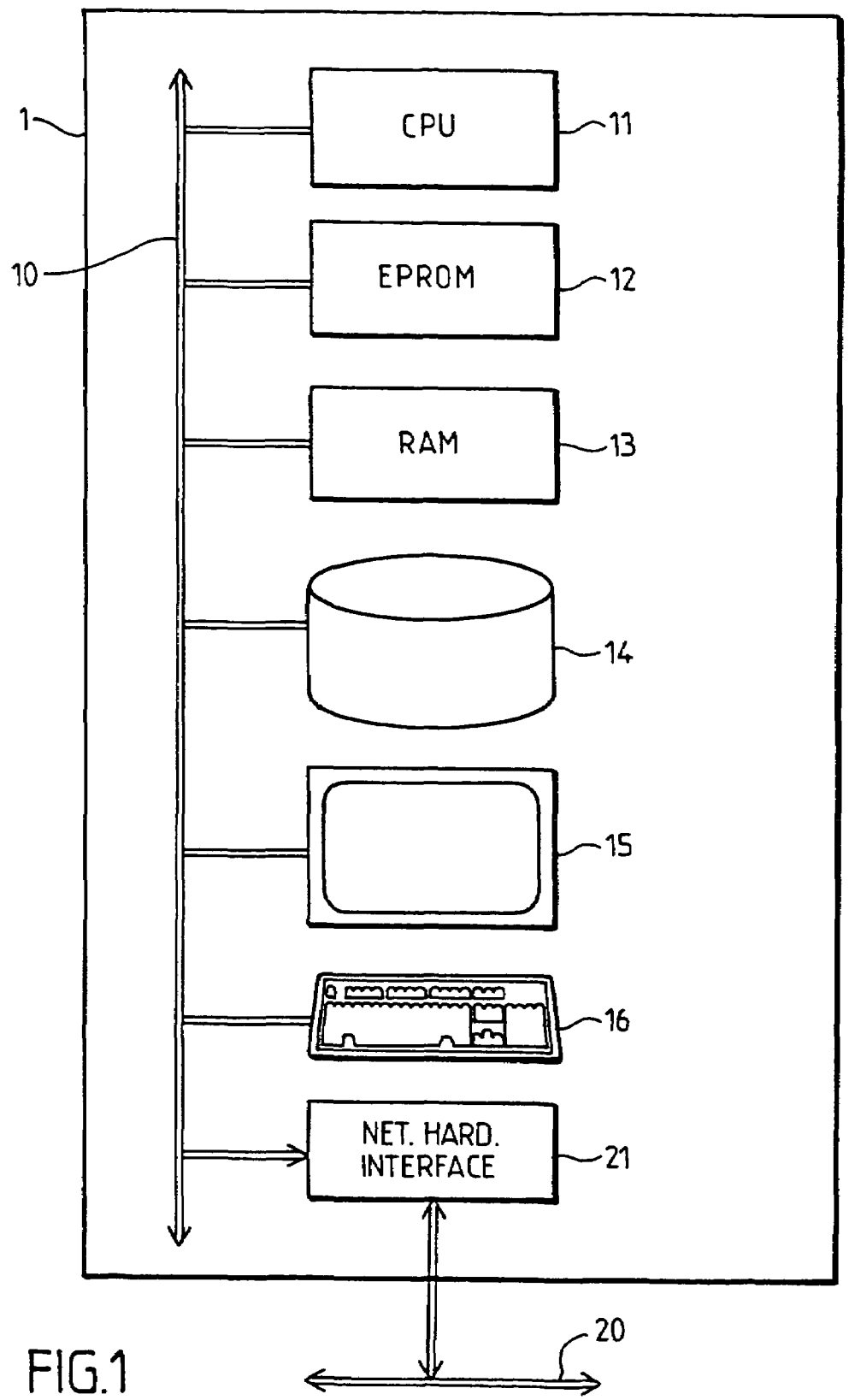
FIG. 1 is a general diagram of a computer system in which the invention is applicable.

Certain of the drawings refer to the Unified Modeling Language, or UML, defined inter alia in Appendix D of the Common Information Model (CIM) specification, available on the web site of the Distributed Management Task Force (DMTF)

protocol (http://), domain (www(dot)dtmf(dot)org/)

or on the web site:

protocol (http://), domain (www(dot)rational(dot)com/uml)

or in the corresponding printed documentation.

As cited in this specification, Sun, Sun Microsystems, Solaris, Java, EmbeddedJava, PersonalJava, JavaBeans, Java Naming and Directory Interface, JDBC, Enterprise JavaBeans, Jini and Sun Spontaneous Management are trademarks of Sun Microsystems, Inc. SPARC is a trademark of SPARC International, Inc.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Additionally, the detailed description is supplemented with the following Exhibits:

Exhibit A describes methods of the DynamicMBean interface;

Exhibit B describes main components of the MBeanInfo object;

Exhibit C describes Java code for building, introspecting and managing a non-MBean object wrapped in an AutoManager;

Exhibit I.1 describes Foundation classes;

Exhibit I.2 describes a Notification system;

Exhibit I.3 describes "MBeanInfo" Classes;

Exhibit II.1 describes "Standard MBeans";

Exhibit II.2 describes "dynamic MBeans";

Exhibit III describes a Managed Bean Server (MBean Server);

Exhibit IV shows examples of code, for use in other parts of the detailed description and of its Exhibits.

These Exhibits are placed apart for the purpose of clarifying the detailed description, and of enabling easier reference. They nevertheless form an integral part of the description of the present invention. This applies to the drawings as well.

These Exhibits contain rewritten portions of the priority document, i.e. French patent application FR-9907583, filed Jun. 15, 1999. In addition, the priority document in English language is incorporated by reference into this patent specification, with the following remarks: FR-9907583 is a provisional filing, based on a JMX specification intended for software users; the JMX specification is a non limiting example of a system in which this invention may apply; the JMX specification also includes a variety of statements expressed in a mandatory form; while these statements may be mandatory for compliance with the JMX specification in itself, such statements are not intended to restrict the scope of this invention in any way.

Now, making reference to software entities imposes certain conventions in notation. For example, in the detailed description, the quote sign " and/or Italics may be used when deemed necessary for clarity, e.g. to distinguish between a basic object and another object having the same name, for example: a dynamic MBean has a "DynamicMBean" interface.

However, in code examples:

quote signs are used only when required in accordance with the rules of writing code, i.e. for string values.

an expression framed with square brackets, e.g. [,property=value]* is optional and may be repeated if followed by *;

a name followed with [ ] indicates an array.

Also, <attribute> may be used to designate a value for the attribute "attribute" (or attribute).

This invention may be implemented in a computer system, or in a network comprising computer systems. The hardware of such a computer system is for example as shown in FIG. 1, where:

11 is a processor, e.g. an Ultra-Sparc (SPARC is a Trademark of SPARC International Inc);

12 is a program memory, e.g. an EPROM for BIOS;

13 is a working memory, e.g. a RAM of any suitable technology (SDRAM for example);

14 is a mass memory, e.g. one or more hard disks;

15 is a display, e.g. a monitor;

16 is a user input device, e.g. a keyboard and/or mouse; and

21 is a network interface device connected to a communication medium 20, itself in communication with other computers. Network interface device 21 may be an Ethernet device, a serial line device, or an ATM device, inter alia. Medium 20 may be based on wire cables, fiber optics, or radio-communications, for example.

Data may be exchanged between the components of FIG. 1 through a bus system 10, schematically shown as a single bus for simplification of the drawing. As is known, bus systems may often include a processor bus, e.g. of the PCI type, connected via appropriate bridges to e.g. an ISA bus and/or an SCSI bus.

Figure 2:
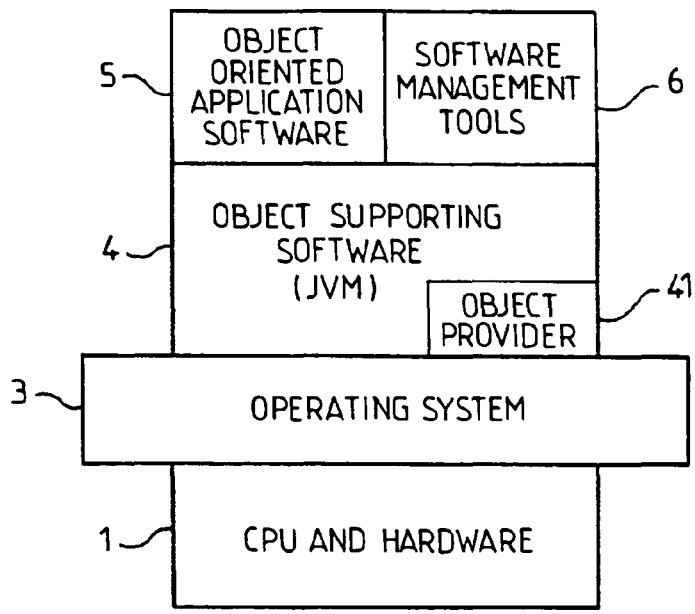
FIG. 2 is a general diagram of an object-orientated software environment in a computer system.

In FIG. 2, the CPU and hardware of FIG. 1 is diagrammatically shown as 1. The computer system also has an operating system 3, e.g. Solaris (an operating system product and trademark of SUN MICROSYSTEMS). Operating systems other than Solaris may be used in accordance with the invention. An object supporting software 4 may be installed over operating system 3. The object supporting software 4 may e.g. include the necessary software to build a Java virtual machine or JVM. It includes an object processor or object provider 41, e.g. the method ClassLoader( ) of the Java language. Object supporting software other than a JVM may be used in accordance with the invention. The object supporting software 4 may then serve to run object orientated application software 5. When required, changes in object orientated application software 5 may be made using software management tools 6. The software management tools may be designed in accordance with the JMX/JDMK specification. However, the invention may apply to other software management tools as well.

Figure 3:
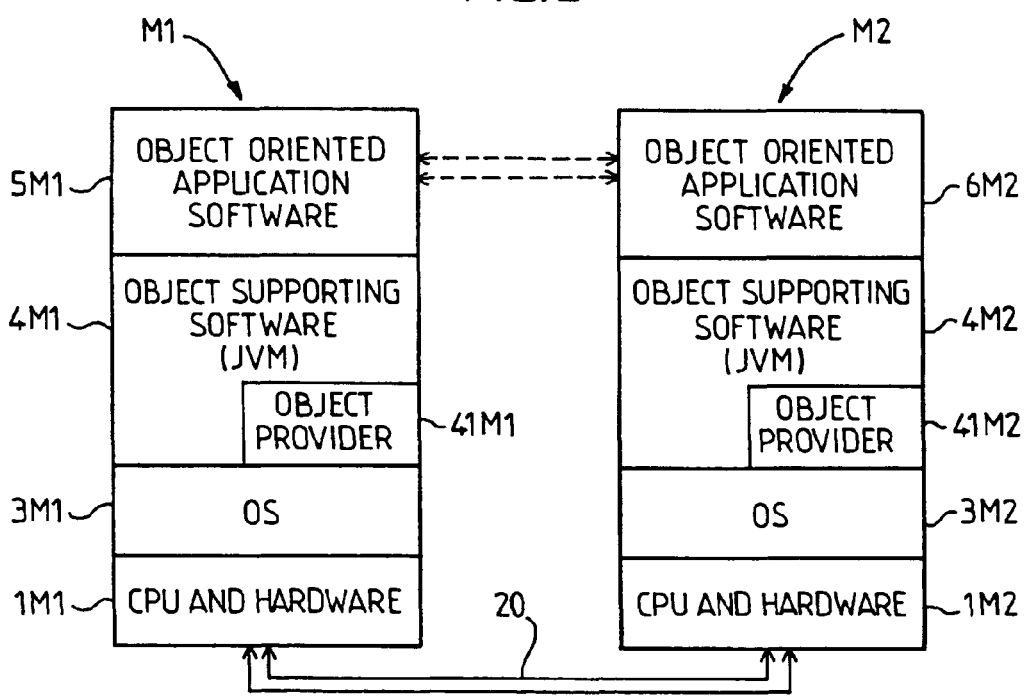
FIG. 3 is a partial diagram of an object software environment system.

The invention may apply within a single machine as shown in FIG. 2. However it will more likely be applied within a distributed environment, as shown in FIG. 3, in the example of two machines M1 and M2, interconnected by a link 20, e.g. a network medium. The machines may have the exemplary structure of FIG. 1, or any equivalent structure. In FIG. 3, the blocks showing the same functions as in FIG. 2 are identified by the same reference number, immediately followed by the machine identifier. For example the operating system of machine M1 is noted 3M1. As shown, an exemplary architecture may include the object orientated application software 5M1 in machine M1, and the software management tools 6M2 in machine M2, which thus may be dedicated to software management. However, many other combinations are possible, based on two machines or more. Provision for a management dedicated machine is an option. One or more machines may include both application software and management tools, as shown in FIG. 2. Also, each machine may support one or more Java virtual machines or other types of machines or devices.

The reader is assumed to be familiar with object orientated programming in general, more specifically with Java, still more specifically with JavaBeans. Details may be found at:
   protocol (http://), domain (Java(dot)sun(dot)com) for Java
   protocol (http://), domain (Java(dot)sun(dot)com/beans/spec(dot)html) for JavaBeans and/or in the corresponding printed documentation, e.g. "The Java Language Specification", J. GOSLING, Bill Joy, Guy STEELE, Addison Wesley, 1996, ISBN0-201-63451-1.

In object oriented programming, an object may comprise properties and methods, together termed [object] members. For convenience, the methods are usually identified by their name followed with ( ). Where a method requires parameters, these are inserted between the two round brackets. Most of the methods are directed to the members or internal contents of the object: get( ) for reading a property, set( ) for writing a property, other property-related methods, access to other methods, etc. . . .

A method contained in an object may be inter alia public or private, depending upon whether it is accessible (may be invoked) from outside the object, or not.

As known, when using an object oriented programming framework, e.g. Java, defining object structures (properties and methods) is generally sufficient for enabling men skilled in the art to write corresponding executable software. Thus, generally, this specification will mainly present object structure definitions.

Object oriented programming uses "classes", which may serve the following purposes:
   objects may be "instantiated" from a class, using an object constructor (in short, a constructor); in Java, a constructor is a method having the same name as the class it belongs to.
   a class may "extend" a parent class, thus inheriting the properties and methods of the parent class.

A class termed "abstract" cannot be instantiated, only inherited. A class termed "concrete" may instantiated and/or inherited. A method in a class may also be abstract: this means that the method will have to be defined in any object instantiating that class.

In Java, a given class may have only one parent class, which in turn may inherit ("extend") one parent class, etc. . . . Other object oriented languages may support multiple inheritance, i.e. a given class may inherit several parents.

However, Java supports a special type of entity, named "interfaces". Interfaces may be viewed as a special form of classes, which may support multiple inheritance. Interfaces may basically contain abstract methods. The word "interface" is used herein to refer to such entities. It covers any similar entities which may be developed in a language other than Java.

A class may "implement" an interface. This means that the class concretely defines the abstract methods existing in the interface.

JavaBeans components (in short Beans) are re-usable software components which can be manipulated visually in a builder tool, e.g. an editor or graphical use interface builder. An example of a builder tool is the JavaBeans Development Kit (JDK). Further details about Beans may be found in the abundant literature, for example in a book entitled "Mastering JavaBeans" by Lawrence Vanhelsuwé, published by SYBEX (ISBN 0-7821-2097-0). Beans share certain common defining features, providing:

a set of properties;
a set of methods for performing actions; and
support for events and for introspection, also known as reflection, which enable access to the structure of Java objects from outside. The JavaBeans Development Kit includes a corresponding reflection API.

A JavaBean supports the so-called getter/setter pairs, defined in accordance with lexical design patterns. This is described in detail in the above cited JavaBean documentation, and will now be summarized.

One considers, for a given Bean, all the public methods, the name of which begins with one of the following prefixes:
   a. "set", e.g. setCurrency( ) or setActive( );
   b. "get", e.g. getCurrency( );
   c. Optionally, "is", e.g. isActive( ).

The methods verifying a. are termed setter or mutator methods. The methods verifying b. or c. are termed getter or accessor methods. In fact, the prefix "get" is sufficient to define getter methods; the prefix "is" is optional, and may be used e.g. for booleans where it is more suggestive in English language.

In each case, the method name is "reduced" by removing its prefix "set", "get" or "is". In the above examples, the reduced method names would be currency or active. Generically, the reduced method name is noted <Myname>. Also, <type> denotes the type of an entity, e.g. int[eger], string, bool[ean], etc. . . . , and <Myvalue> designates a value of the entity having the <type>. Formally, the above methods may now be generically represented as follows, in the example of Java code:
   void set<Myname>(<Type><Myvalue>)
   <Type>get<Myname>( )
   Boolean is <Myname>( ).

Where at least one of the above public methods exists for a given Java object, <Myname> is termed an attribute of that object, with the following possibilities:
   if there is a setter method set<Myname>( ), then the attribute is writable;
   if there is one of the two getter methods get<Myname>( ) or is <Myname>( ), then the attribute <Myname> is readable, and has the type of that method;
   an attribute satisfying both conditions is writable and readable.

In fact, the attribute may be a property of the Bean, or not. A property <myname> may conveniently begin with a lower case letter, while a corresponding attribute (<Myname>) begins with an upper case letter. Other naming conventions expanding or replacing the JMX specification may be used.

In other words, whenever a Bean offers a pair of getter and setter methods having the same <Myname>, then they form a getter/setter pair, defining a <Myname> readable and writable attribute of the JavaBean. In practice the expression "getter/setter pair" is usually broadened to mean "getter and/or setter", i.e. to cover also the cases where only a getter method or accessor method or only a setter or mutator method is present. A getter and/or setter pair constitute accessor/mutator method(s). In the following, the expression "accessor methods" will be used to encompass both accessors and/or mutators.

The field of application is not restricted to the above examples of getter and setter methods. More generally, the invention may apply where a preselected rule enables the following:
   in correspondence with a name, i.e. the attribute name, defining uniquely the names of a read method and/or of a write method associated to that attribute;

conversely, in correspondence with the names of a read method and/or of a write method, defining uniquely a name, i.e. the attribute name, associated to these methods.

Thus, those of the methods which correspond to a getter and/or a setter method are correctly represented by the corresponding attribute. The read and/or write status of the attribute depends upon whether it corresponds to a getter method, a setter method, or both.

All the other public methods of a Bean which do not belong to a getter and/or setter pair are termed "operations".

It must be understood that the word "attribute" (of an object), as above defined, is based on accessor methods, e.g. the getter/setter pair, and also constitutes a representation of the accessor methods. This is not the same as the common meaning of the word attribute in the computer art, as used for example in an expression like "color attribute", where "attribute" refers to a property of an object, rather than to the object itself.

In EP-A-909057, it has been proposed to use Beans for managing resources in a computer system, especially a computer network. Beans used for this purpose are termed Managed Beans or MBeans. More generally an MBean may be termed "managed object". In EP-A-909057, it has been generally proposed to provide each MBean with public methods enabling the management of the resource represented by that MBean. In order to avoid unduly lengthening this specification, the descriptive contents of EP-A-909057 (U.S. Ser. No. 08/944,174, filed Oct. 6, 1997), EP-A-915419 (U.S. Ser. No. 08/944,174, filed Oct. 6, 1997), EP-A-915419 (U.S. Ser. No. 08/944,396, filed Oct. 6, 1997) and EP-A-909058 (U.S. Ser. No. 08/944,396, filed Oct. 6, 1997) are incorporated herein by reference. Generally, the above cited prior patent applications define:

managed objects or MBeans, a framework for registering MBeans, an MBean repository service for storing pointers to registered MBeans, a filtering service enabling selection of MBeans, a metadata service, an access control service, an event service, a relationship service, a dynamic native library loading service, a managed object adaptor server.

Now, managing a resource necessitates that the resource is "instrumented", i.e. that access is enabled to corresponding information on that resource. The instrumentation should obey preselected general rules (e.g. the JMX rules). Thus, in accordance with another definition, MBeans are software objects which implement not only resources, but also the instrumentation of such resources, in accordance with predefined rules. Conversely, the instrumentation of a given resource may be provided by one or more MBeans.

In accordance with another aspect of this invention, there is defined for each MBean a management interface, comprising:

attributes, each corresponding to a getter/setter pair of public methods, and operations, comprising those of the public methods which do not belong to getter/setter pairs.

Thus, in an example, an MBean may be viewed as a Java object that implements specified interfaces in accordance with specified rules, e.g. specified lexical design patterns. The exposed interface may be controlled: for example, an MBean attribute can allow read-only or read-write access.

In accordance with an embodiment of this invention, a software management framework may comprise:

an instrumentation level, comprising "MBeans", an agent level, comprising an MBean server and optional Management services, a manager level.

In an exemplary embodiment (FIG. 4), based illustratively on two Java virtual machines 4M1 and 4M2, implementing the agent level and instrumentation level:

a) the manager level comprises e.g. a JMX-compliant Management Application 1100, a Web Browser 1110, and a Proprietary Management Application 1120;

b) in the "agent level":

b1) machine 4M1 has an MBean server 2100 having Protocol Connectors or Adaptors 2101, 2102, enabling communication with JMX-compliant Management Application 1100, and Web Browser 1110, respectively. Proprietary Management Application 1120 needs a JMX Manager 1122 to be connected with MBean server 2100 via protocol connector 2103. The agent level may further include a service module 2110;

b2) machine 4M2 has two MBean servers 2200 and 2300, illustratively provided with Protocol Connectors or Adaptors 2201, 2202, respectively, interconnected with JMX manager 1122.

C) at the "instrumentation level":

c1) machine 4M1 has objects 3101 and 3102, which are MBeans, i.e. beans registered in MBean server 2100, and a plain JavaBean component 3103, which is a non-MBean object, i.e. is not registered in MBean server 2100.

C2) machine 4M2 has objects 3201 and 3202, registered in MBean server 2200, and objects 3301 and 3302, registered in MBean server 2300.

Figure 4:
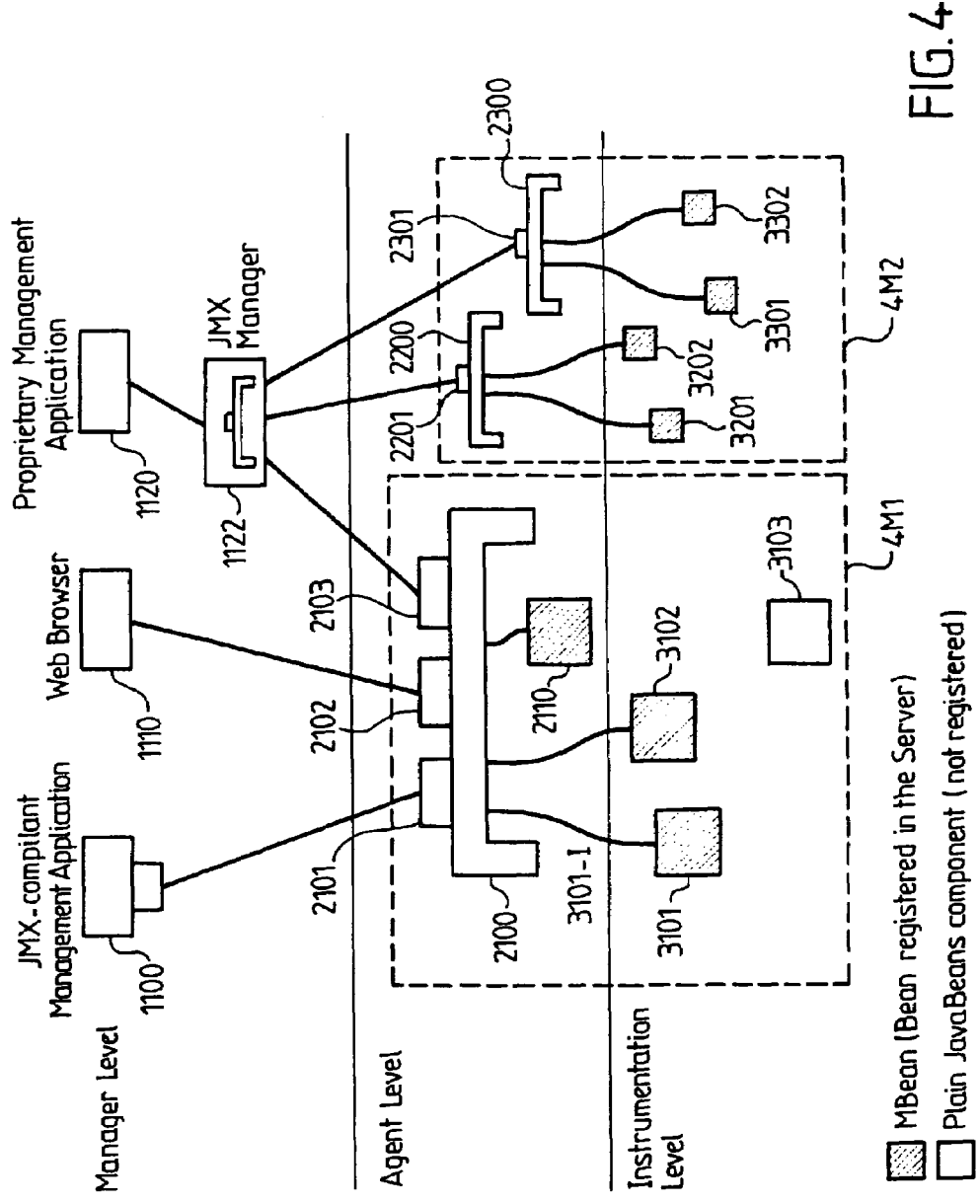
FIG. 4 is an example of a computer system having a software environment in accordance with the invention.

The MBean objects have a management interface, e.g. 3101-I for MBean 3101 (which is supposed to be a standard MBean). Only the interface label 3101-I is shown in FIG. 4, to avoid too much complexity in the drawing.

The element of an embodiment of the invention will now be described in more detail.

A given object orientated programming framework uses fundamental entities (object definitions). Usually, e.g. in Java, these entities are defined as "classes", which may serve the following purposes:

objects may be "instantiated" from a class, using an object constructor (in short, a constructor);

a class may be defined from a parent class, from which it inherits its properties and methods.

An object may be instantiated as an empty structure, using a so-called "default constructor", taking no arguments. Alternatively, an object may be instantiated with arguments being directly defined at object creation. This uses a so-called "non-default constructor", taking one or more arguments. The arguments may be attributes, methods, others objects created, or else.

A class termed "abstract" cannot be instantiated, only inherited. A class termed "concrete" may instantiated and/or inherited.

Thus, in this FIG. 4, the MBean objects 3101 and 3102 are manageable in this architecture by the JMX management model unlike to the non-MBean object 3103. The rest of the description will focus on the instrumentation level to define how non-MBean objects can be manageable by the agent level, itself manageable by the manager level.

In accordance with the above cited features of the JMX specification, objects using JDMK can be managed only if they comply with the specification, i.e. qualify as MBean objects. Other objects (non-MBean objects) cannot be managed. This problem of management of non-MBean object is solved by the present invention through the use of a dynamic Mbean wrapper by using a DynamicMBean interface, then introspecting the non-MBean java object, and finally exposing a management interface to the management system via the normal mechanism. In this way, a layer is introduced between the management system and the non-manageable object to allow its management through all JavaBean exposed attributes and operations.

To understand how this problem is solved by the present invention, the following definitions are presented:

in the Java context and for a Java object, introspection is a means by which public method and constructor information are obtained as well as their corresponding parameters and return type signatures. Introspection is realized to allow the management operations by a JMX agent, more precisely by the MBean server 2100 of FIG. 4;

an MBean, for example "MyMBobject", inherits the naming methodology of the JavaBean specification called design patterns. For example, the following design pattern of a method defined as public <AttributeType>get<AttributeName>( )

is used to determine the name of the readable attribute which is "AttributeName". These design patterns allow introspection of what are exposed as part of resources: attributes and operations. An MBean applies also further constraints to "instrument" these resources. Two of these constraints are discussed here:

the MBean may implement an MBean interface, defined by a class called, according to naming convention, <name of Mbean>+"MBean", here "MyMBobjectMBean".

the MBean may implement a DynamicMBean interface predefined in the JMX specification.

In both cases, an MBean may accordingly be manageable by normal JMX means. If the first requirement is met, the object can be considered a standard MBean; only methods exposed in the interface "MyMBobjectMBean" may be used to retrieve attributes and operations for management by the MBean server 2100; the design patterns may enable the methods of the MBean server to identify the attributes and operations from the methods of the "MyMBobjectMBean" interface (defining a standard MBean), at compile time. If the requirement met is the second one, the object can be considered a dynamic MBean. Then this dynamic MBean may provide a mapping for existing resources at runtime to the MBean server thanks to its predefined DynamicMBean interface.

This invention is based primarily on the use of a determined object for its realization, e.g. the dynamic MBean object described above. This invention teaches mainly how non-MBean objects may be managed due to the determined object in an environment, e.g. in the JMX environment and specifically in the JDMK environment. The non-MBean objects considered are more specifically JavaBeans objects, but what follows can be extended to other objects.

It is reminded that the DynamicMBean interface allows the management interface of an MBean to be defined dynamically at runtime, instead of at compile time like in a standard MBean; this brings more flexibility to the instrumentation level when data structures are likely to evolve often over time. Thus, in a dynamic MBean, there is no defining interface at compile time like "MyMBobjectMBean" in a standard Mbean. Instead, the predefined DynamicMBean interface has a getMBeanInfo( ) method used by the MBean server. This method may provide at runtime a MBeanInfo class. It is up to the Dynamic MBean implementation which implements the Dynamic MBean interface to provides the getMBeanInfo( ) method and it is the MBeanInfo object returned to the MBean server by this method which exposes the management interface. The Dynamic MBean implementation thus "decides" what the management interface is, based on its internal logic.

The MBeanInfo class will be now described.

The MBeanInfo class is used to reflect a view of the different components of a dynamic Mbean. This MBeanInfo class has indeed specific methods, as seen in EXHIBIT B and more precisely in FIG. 11A. Requested by these specific methods, the components of the dynamic MBean are returned in the MBeanInfo class.

A list of all the methods of the dynamic MBean is first obtained. Then, the request in EXHIBIT B1, getAttributes( ), returns the attributes names from the names of all these methods of the dynamic MBean in accordance with the naming methodology of the JavaBean specification. Thus the attributes names and the corresponding getter/setter methods of a dynamic MBean may be obtained during the introspection. These attributes names and their corresponding getter/setter methods may be contained in a class called MBeanAttributeInfo in order to fill the MBeanInfo class.

For example, "MB1" is defined as a dynamic MBean object. During the introspection, accessor methods may be found in this object "MB1":

int getPort( ): get the object "MB1", the attribute value <Port> of integer type.

void setPort(int port): set the attribute "Port" of the object "MB1" to the value <port> of integer type.

In the operation pair int getPort( ) and void setPort(int port), the names of the methods contain the name "Port" and return the same answer type. So, an attribute called "Port" of integer type may exist in "MB1". Then this attribute may be used to find the corresponding accessor methods during the introspection. Thus the MBeanAttributeInfo object contains attributes names and their corresponding getter/setter methods of the MBean object.

In addition, one can optionally specify deep or shallow introspection. Deep introspection means apply introspection to all methods of the object "MB1", including those inherited by ancestor objects of this object. Shallow introspection means apply introspection only to methods defined in the object "MB1", excluding those inherited by ancestor objects of this object. If only one introspection mode is implemented, then deep introspection should be preferred. Shallow introspection might be used where it is desirable to restrict memory allocation needs.

An MBeanOperationInfo class may be defined to answer to the getOperations( ) method of the MBeanInfo in EXHIBIT B2. This MBeanOperationInfo class may contain operations from the introspection of the dynamic MBean object. These operations represent any method which does not fit an attribute design pattern like a reset( ) method. One can also optionally specify deep or shallow introspection to obtain these operations.

Figure 11:
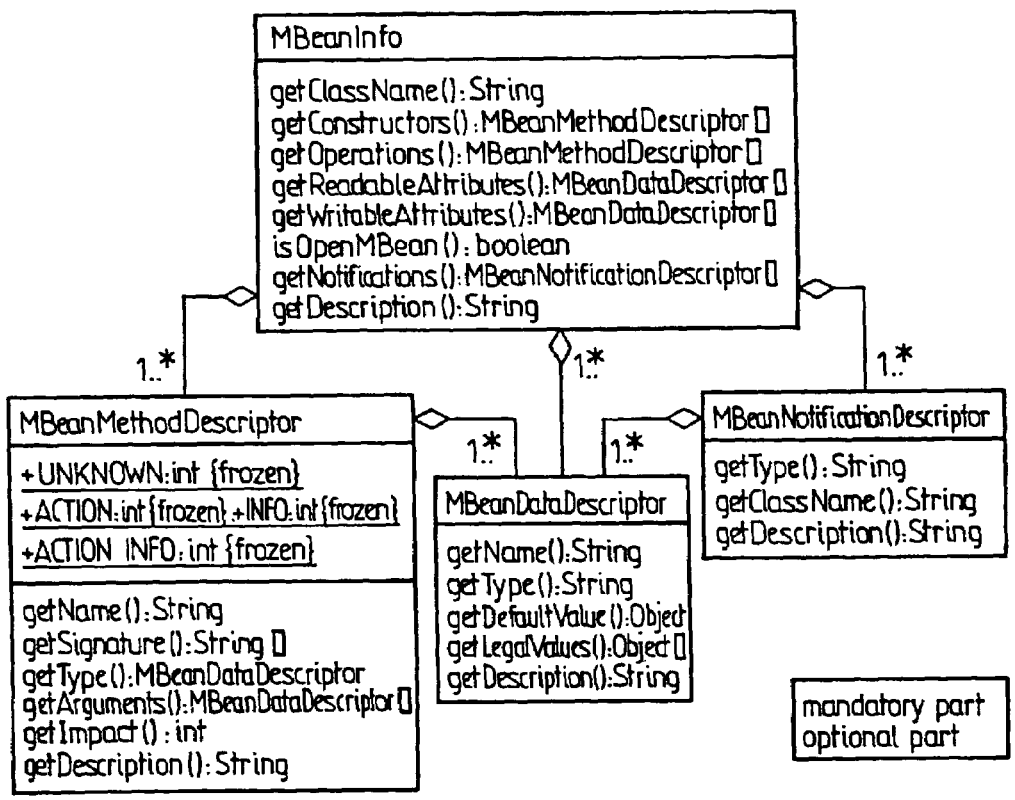
FIG. 11 shows an UML (Unified Modeling Language) diagram of the "MBeanInfo" class in general.
Figure 11A:
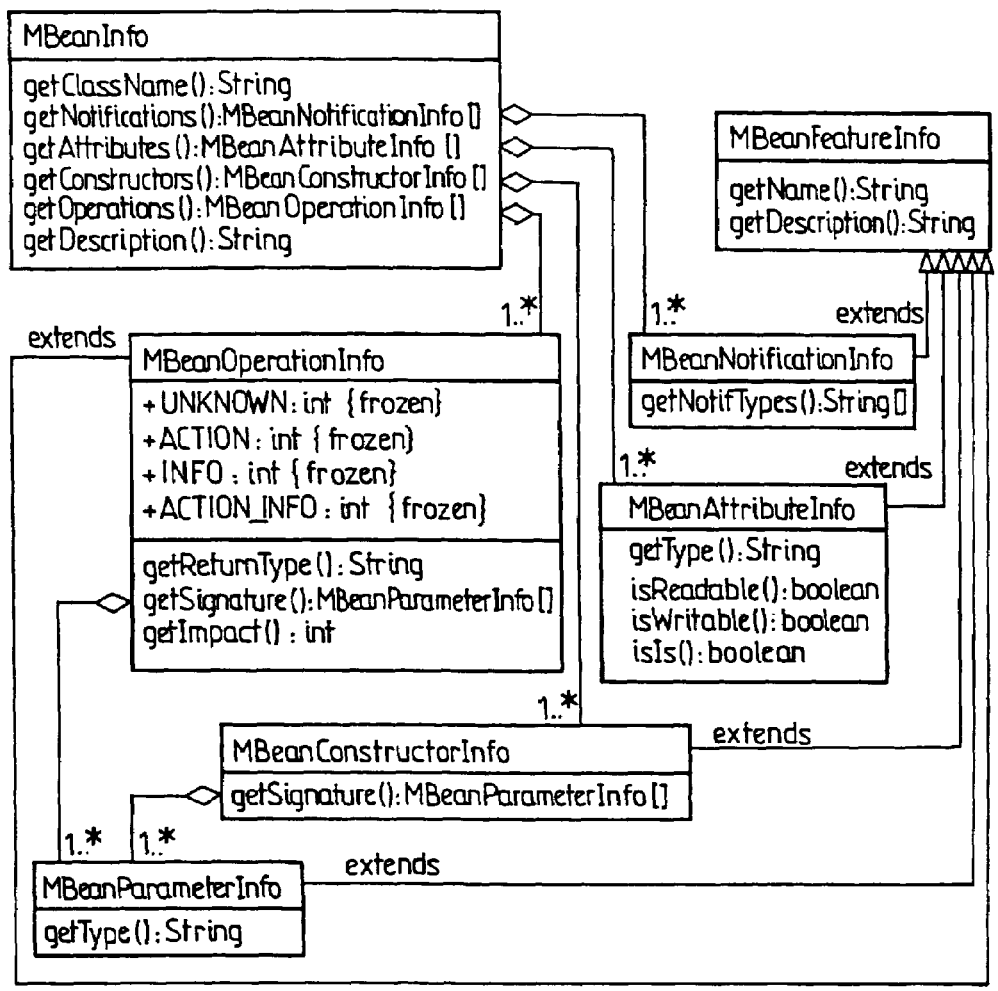
FIG. 11A shows another UML diagram of an alternative embodiment of the "MBeanInfo" class.
Figure 12:
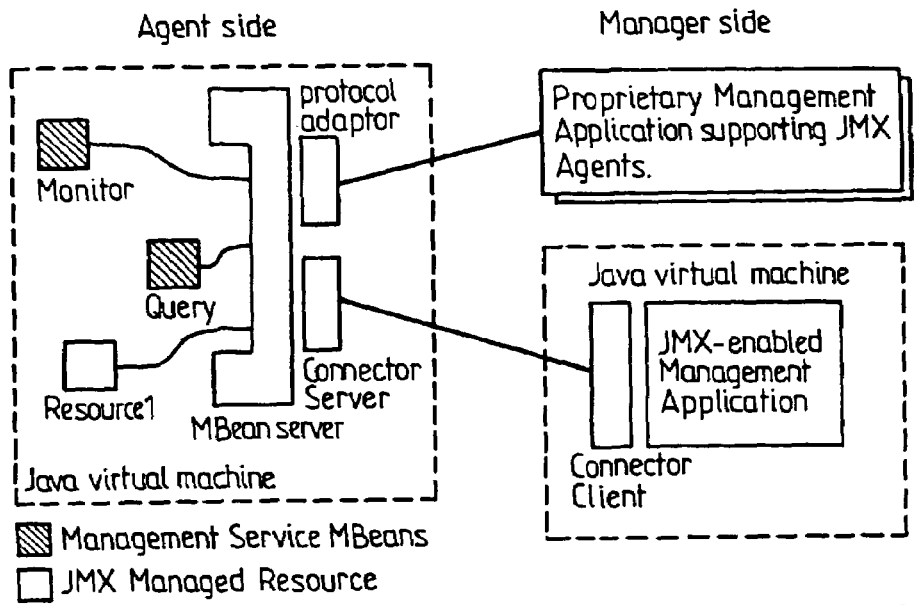
FIG. 12 shows the main types of components of a software environment embodying the invention.

Since other MBeanInfo subclasses are not directly related to this invention, reference is made to EXHIBIT C and FIG. 11A for their description.

Figure 5:
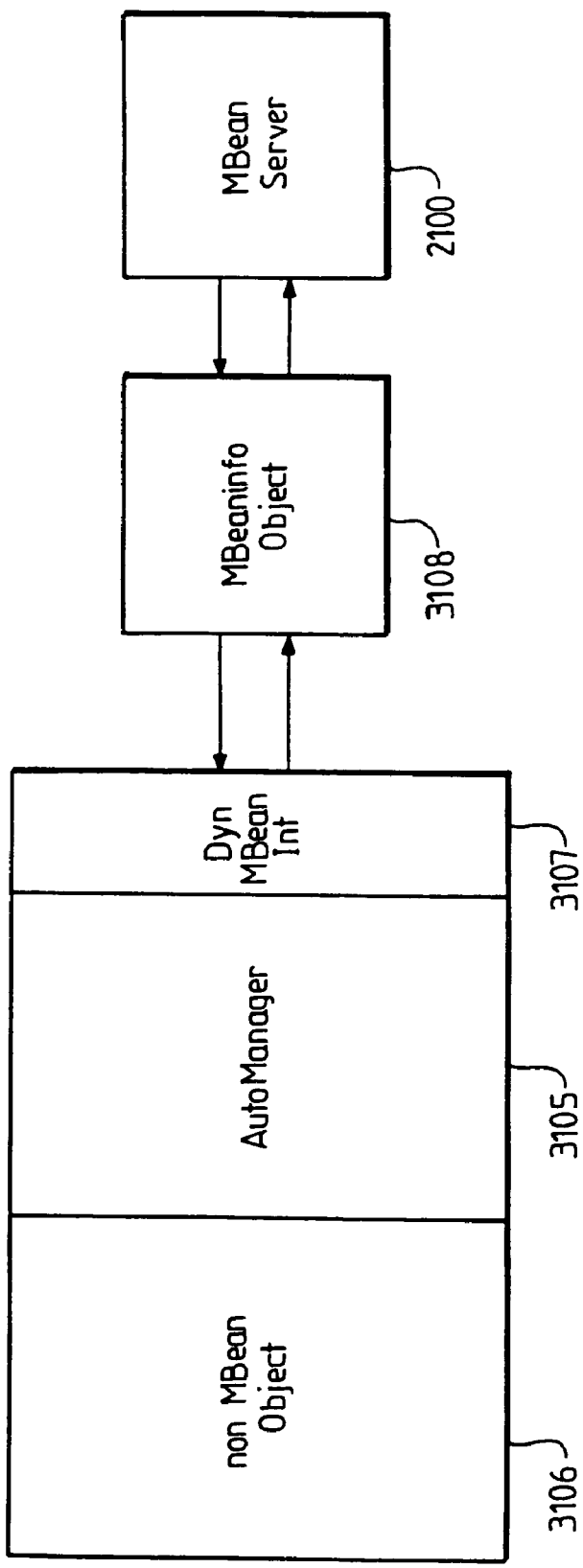
FIG. 5 is a partial diagram of management components for a non-MBean object in accordance with the invention.

FIG. 5 shows specific components of an embodiment of the present invention.

Before the present invention, a non-MBean object could not be managed in this JMX environment. It will be explained now how a non-MBean object may be manageable in accordance with the present invention.

As shown in FIG. 5, an MBean server 2100 may be capable of transmitting management orders from the management level to the instrumentation level via connections. The instrumentation level may be composed of a new MBean object, called in this embodiment, AutoManager 3105. This AutoManager takes a non-MBean object 3106 as a parameter in its constructor. For example as seen in EXHIBIT C, the Auto- Manager class may extend the Object class and implements DynamicMBean interface 3107 of the JMX specifications. AutoManager is then a subclass of the Object class and also implements the methods defines in the DynamicMBean interface to become a dynamic MBean object. In its constructor as seen in EXHIBIT C1a, the dynamic MBean object 3105 may be defined as AutoManager with, for example, the object Object (the name of a non-MBean object, also called automanaged object). Thus, the AutoManager inherits the non-MBean object 3106 and its specifications, this entity represent the wrap 3100. This Automanager object 3105 is instantiated and registered in the MBean server 2100. This MBean server may then transmit managing orders via connections with the DynamicMBean interface 3107. To realize this management, an MBeanInfo object 3108 may also provide a view of the management interface after an introspection of the object 3106. This MBeanInfo object of the AutoManager is accessed by a getMBeanInfo( ) method of the DynamicMBean interface 3107.

Figure 6:
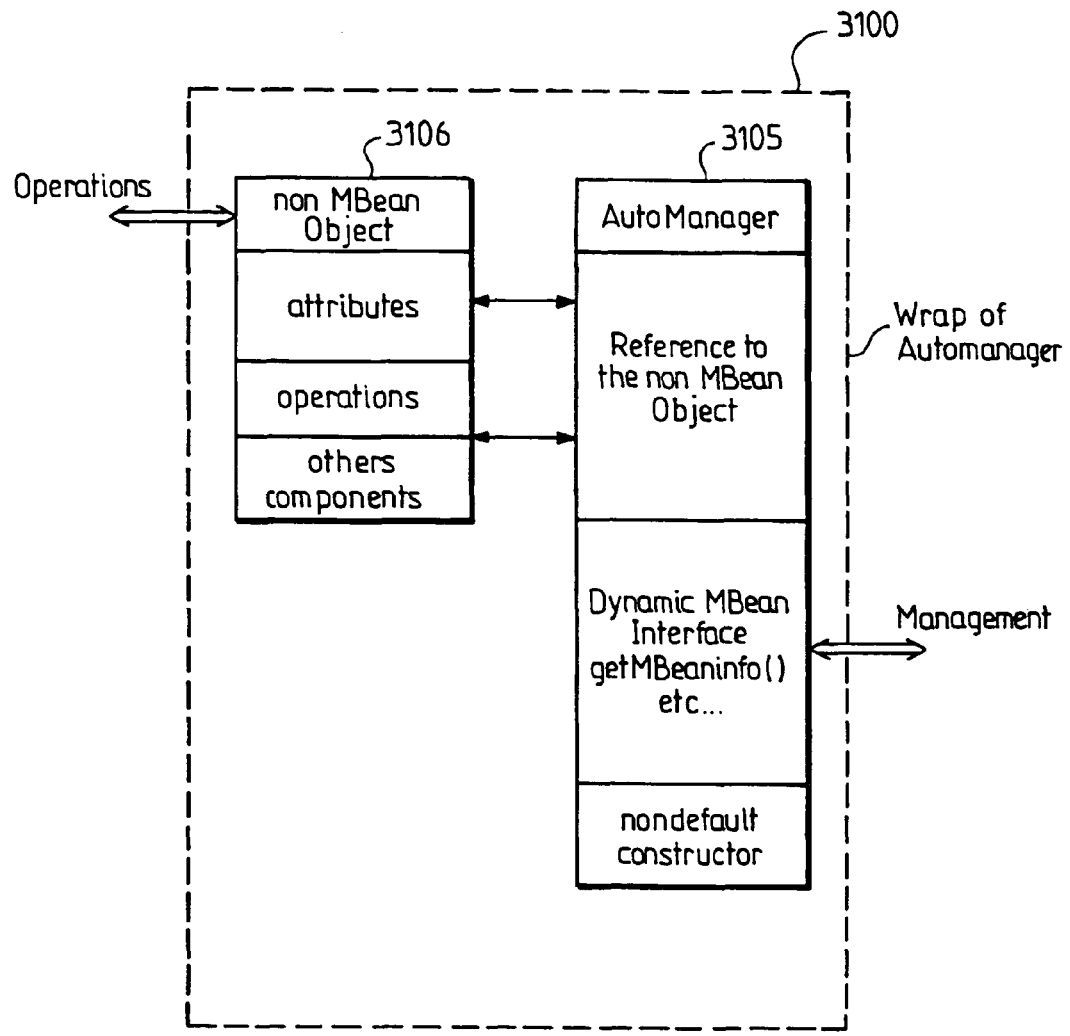
FIG. 6 is a diagram of a dynamic MBean object with a wrapped non-MBean object.

In FIG. 6, the non-MBean object 3106 may contain attributes, methods or further components. It operates directly with the software system (component 5 FIG. 2) by the way of operations; in addition, it may be managed by the JMX management system thanks to the wrap 3100. The dynamic MBean object, AutoManager 3105, comprises three main components:
 a reference to the non-MBean object which is defined as a parameter in the AutoManager constructor and thus may allow the components of the non-MBean object to be viewed as a simulated MBean object after the introspection and the exposed management interface, and to be requested for the management,
 a non default constructor to build the AutoManager and its parameters,
 a DynamicMBean interface used for rendering possible the management of the non-MBean object with the management level.

AutoManager is already a compliant MBean, and as such may be manageable by the JMX management model. This JMX management model involves normally a call of the getMBeanInfo( ) method of the MBean which determines the name of the attributes and operations using an introspection of the dynamic MBean object itself. In this invention, this step is characterized in being an introspection of the non-MBean object using standard JavaBeans rules.

The description below can be read in conjunction with to the code example shown in the EXHIBIT C.

Figure 7:
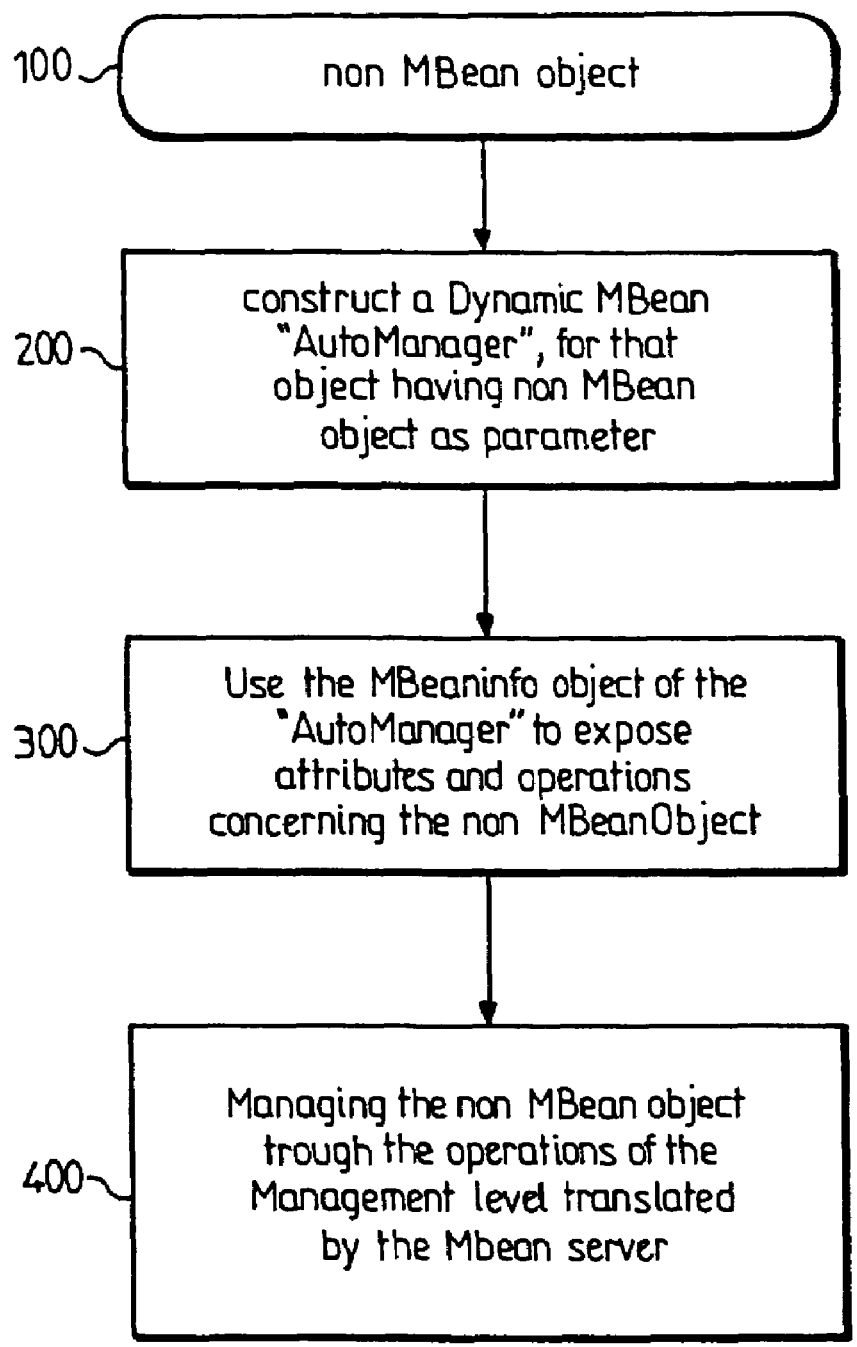
FIG. 7 is a flow chart showing an example of non-MBean object management.

Reference is now made to flow chart of FIG. 7. The object to be managed is the non-MBean object in step 100 which becomes a parameter in the constructor of a class called AutoManager implementing a DynamicMBean interface in step 200 as shown in EXHIBIT C and specifically C1a. Then a specific dynamic MBean object AutoManager is created, enabling an MBeanInfo object of the AutoManager to expose attributes and operations concerning the non-MBean object in step 300 shown in EXHIBIT C6b. The MBeanInfo object described hereinafter is normally used to return the result of the introspection of a dynamic MBean object itself and to provide the exposed management interface at runtime. Once a view of the non-MBean object is provided, the step 400 authorizes the management of this non-MBean object through methods of the Management level translated by the MBean server as shown in EXHIBIT C1b, C2b, C3b and C4b.

These last two steps 300 and 400 will be now described in more detail.

Figure 8:
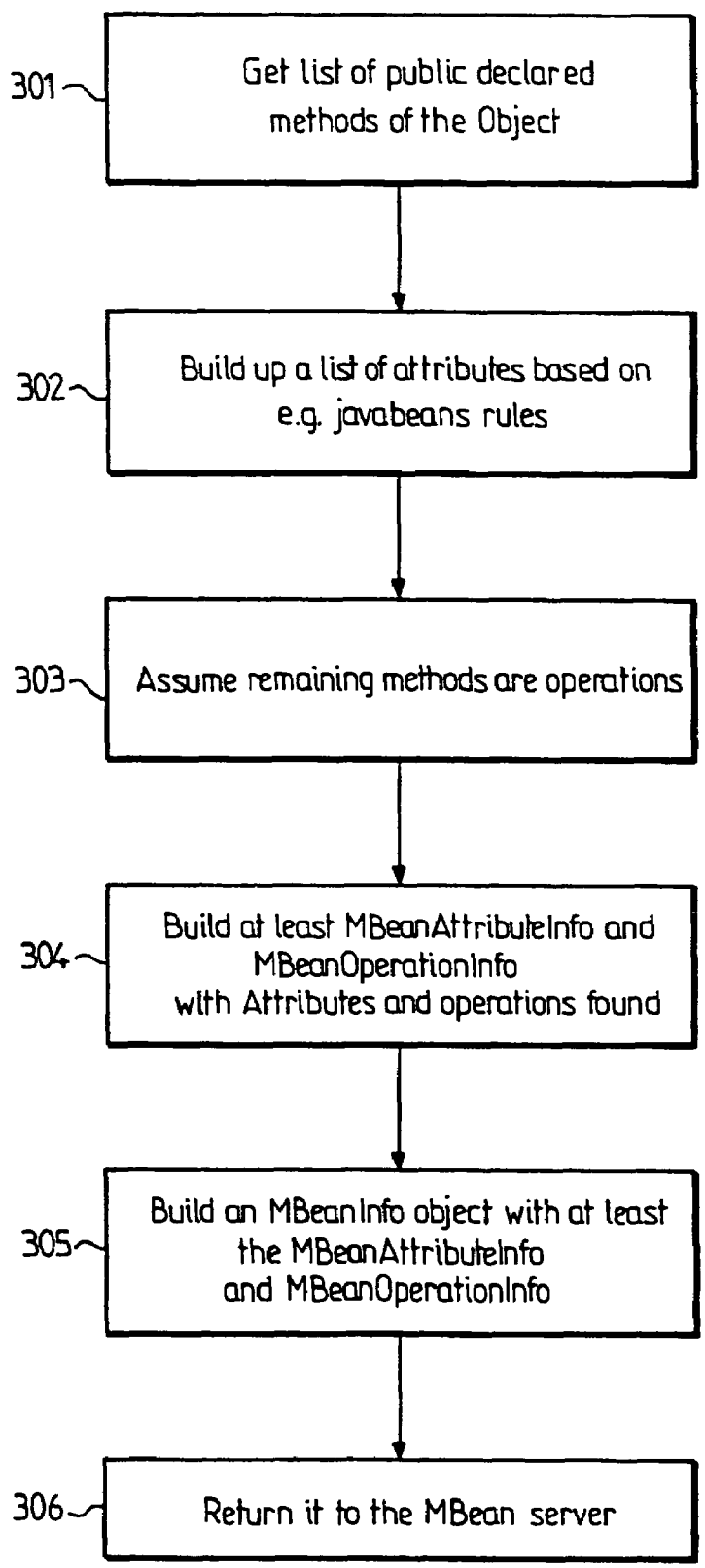
FIG. 8 is a flow chart showing in more details the step 300 of the FIG. 7.

Referring to the FIG. 8, the creation of the dynamic MBean object AutoManager permits the introspection of the non-MBean object. First, the list of all public methods is obtained, as described in step 301 and as shown in EXHIBIT C2a. Then, the methods of the AutoManager are executed to give a view of the AutoManager management interface, concerning at least attributes and operations as shown in EXHIBIT C6a and C8a. These public methods may define then a list of attributes in step 302 in accordance with e.g. the JavaBeans rules. These JavaBeans rules define the name of attributes corresponding to the names of found methods "get", "set" or "is" as already explained and as shown in EXHIBIT C6a using C3a, C4a and C5a. It shall be assumed in step 303 that all remaining methods defining no attribute are operations. Thus the getter/setter methods are collected as shown in EXHIBIT C6a. They get removed from the list of public declared methods and only operations remain. Attributes from getter/setter methods are rendered manageable, by registering attribute values and the corresponding getter/setter methods signature into a MBeanAttributeInfo class in step 304 as shown in EXHIBIT C6a.

The same remark is available for operations registered into a MBeanOperationInfo class in step 304 shown in EXHIBIT C8a.

Optionally, notifications can also be registered into a MbeanNotificationInfo class as shown in EXHIBIT C9a.

To manage this non-MBean object, the MBean server may call the getMBeanInfo( ) method of the DynamicMBean interface, implemented in the AutoManager, to ask for a view of at least the attributes and operations of the non-MBean object in a returning MBeanInfo object in step 300 of FIG. 7 and EXHIBIT C6b.

The introspection providing MBeanAttributeInfo and MBeanOperationInfo enable the building of the MBeanInfo object of the AutoManager to answer the getMBeanInfo( ) method of the DynamicMBean interface in step 305. Then the MBeanInfo object is returned to the MBean server in step 306.

This MBeanInfo object comprises attributes and methods at least, whose information corresponds to the requests of Exhibit B and more precisely of FIG. 11A. This last figure enables an understanding of the kind information which can be found in an MBeanInfo object regarding attributes types, names, arguments, methods names, signature and so on . . . .

Figure 9:
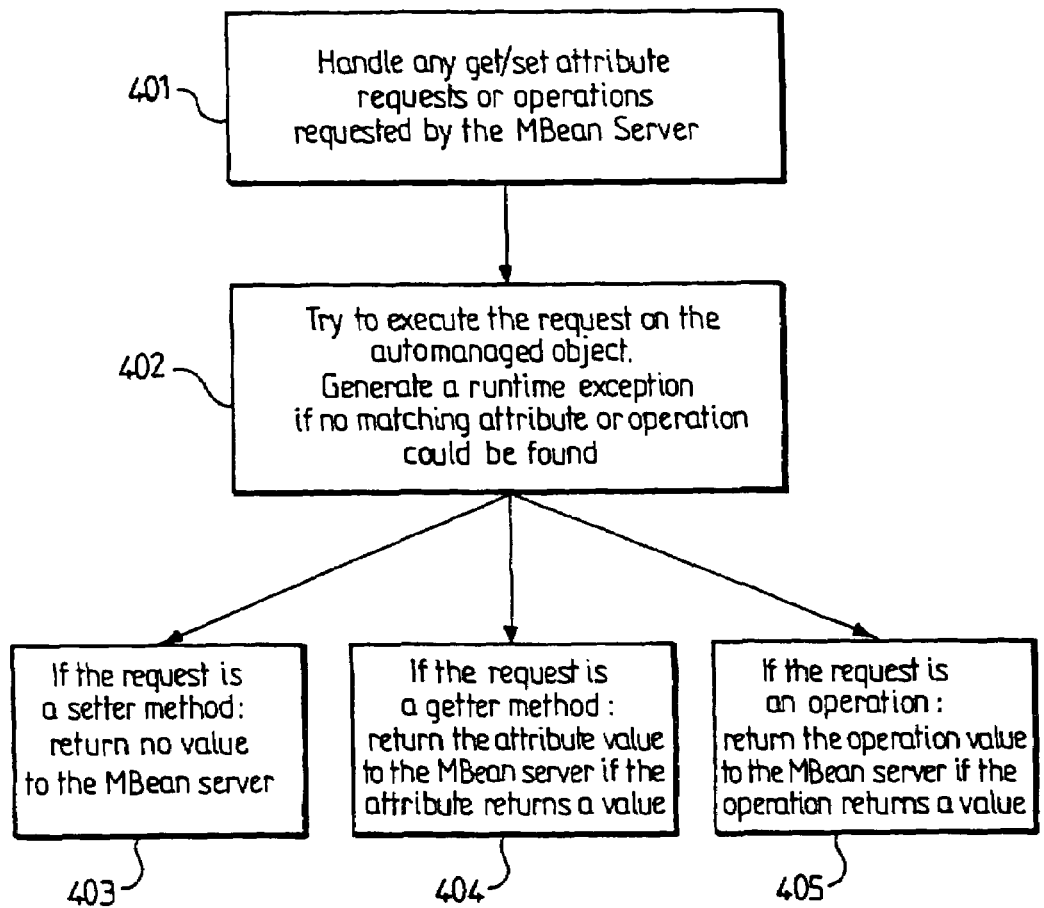
FIG. 9 is a flow chart showing in more details the step 400 of the FIG. 7.

Referring to FIG. 9, the management of the non-MBean object is effected in step 401 by handling any get/set attributes requests of the Management level adapted to a list of designated attributes or to one specific designated attribute, rendered useable with the results of the MBeanInfo object, as define in the EXHIBIT A1, A2, A3 and A4. These attributes requests or operations are requested by the MBean server from the management level. The requests are attempted to be executed on the non-MBean object auto-managed in step 402. If this attempt fails, a runtime exception is thrown to inform that no matching attribute or operation could be found. Else, according to the requested method, different results are possible in the step 403. If the requested method is:
 a getter method, it returns the value of attribute or attributes retrieved to the MBean server or throws exceptions in relation with a problem found.
 a setter method, it returns no value but set the value of a specific attribute or specific attributes or throws exceptions in relation with a problem found.
 an operation, it returns the operation value to the MBean server if the operation returns a value or throws exceptions in relation with a problem found.

The requests of the Management level may be the methods described in EXHIBIT A, methods that may be implemented in the AutoManager from the DynamicMBean interface. All returning results using these methods may be contained in the MBeanInfo Object. Thus, the MBeanInfo object is used to apply attribute changes, and get attribute values from the auto-managed object both due to the dynamic MBean implemented methods.

The management methods implemented in the AutoManager from the DynamicMBean interface will now be described referring to EXHIBIT A and C.

First, the getAttribute(Attribute) from EXHIBIT A1 and EXHIBIT C1b and setAttribute(Attribute) from EXHIBIT A2 and EXHIBIT C2b are methods of the DynamicMBean interface used to get or set the value of an attribute whose name is known, and they are called by getAttributes (AttributeList) from EXHIBIT A3 and EXHIBIT C3b and setAttributes(AttributeList) from EXHIBIT A4 and EXHIBIT C4b, used to get or set a list of attributes values.

When these method are called, a list of methods signatures of the automanaged object is provided at runtime and according to shallow or deep introspection. The attribute "attribute" is found in matching methods names getter or setter and the methods signatures. That is to say the methods names "get"+ "attribute", "is"+"attribute" or "set"+"attribute" are compared with the methods signatures of the automanaged object. A check is thus done for matching methods names and signatures in the automanaged object, and if a match is found, this method is invoked with the requested parameters as seen in EXHIBIT A5. If no matching method is found, an AttributeNotFoundException is thrown. The method name matching is once again done in accordance with the guidelines laid out in the JavaBeans specification; then the invoke( ) method is called and render possible the management of the automanaged object with the method described below.

For example, assuming that a non-MBean object called "NMBO1" is used to initialize an AutoManager, the management method Object getAttribute("Port") is defined as the method getAttribute( ) EXHIBIT A1 with parameter "Port" known from MBeanInfo object. If a call is get to Object getAttribute("Port") by the MBean server:

a methods list of the automanaged object is done according to deep or shallow introspection.

the list of available methods of the object "NMBO1" containing the name "Port" is extracted from the general list.

this extracted list is looked through: int getPort( ) method may be found and is then invoked in EXHIBIT A5.

its result is returned as the result for the getAttribute( . . . ) call to the MBean server, exposed in the MBeanInfo object.

For operations, the process is a bit more simple, since operations do not need to follow a specific naming convention, so the method can be invoked directly in EXHIBIT A5 if it exists, else a ReflectionException is thrown.

The core of this principle involves returning an MBeanInfo object, providing a view of the auto-managed object, back via the method of the dynamic MBean implementation called getMBeanInfo( ) and may be requested by a MBean server. This method is normally specific to the introspection of dynamic MBean object itself, but is extended here to introspection of the non-MBean object.

Thus this introspection renders it possible to manage the non-MBean object: the Mbean server calls the invoke( ) method to make it possible for the caller to call actions that lead for example to get and/or set attributes or to get operations values of the non-MBean object dynamically at runtime.

In this invention, the introspection of the dynamic MBean object, instead of exposing attributes or operations of the AutoManager object, is done on the non-MBean object using standard JavaBeans rules to find out which operations and attributes are exposed. These values are returned in the MBeanInfo object to the MBean server, thanks to the DynamicMBean interface. An example of code implementing this is coded in EXHIBIT C. Thus the introspection provides a simulated MBean view of the non-MBean object.

In this way, AutoManager is an MBean wrapper used to hide the fact that the managed object is in fact not an MBean. Because of the MBean wrapper, the introspection rules can be used to negotiate the correct response to management requests such as getting/setting MBean attributes and performing operations on the non-MBean object. Thus, the dynamic MBean object is used in this situation mainly for its dynamic MBean implementation in order, for the non-MBean object, to establish a link with the JDMK environment and to be manageable by the agent and manager level.

An interesting side effect of this principle enables even non-JavaBean objects to be to some extent, manageable, since even if no attribute getter/setter pairs exist, all its public operations will be exposed as operations, and may be used to exercise the object.

This invention is not restricted to the above described embodiment, and has several features of broader interest.

Although the above describes the use of a dynamic MBean to wrap a non-MBean object, it might also be used to wrap an object already qualifying as an MBean.

As described, a computer system encompasses one or more machines, which may be real or virtual.

This invention also covers the proposed software code itself, especially when made available on any appropriate computer-readable medium. The expression "computer-readable medium" includes a storage medium such as magnetic or optic, as well as a transmission medium such as a digital or analog signal. The software code basically includes the so-called driver code and further code as described.

EXHIBIT A

Methods of the DynamicMBean Interface.

It defines methods that should be implemented in a dynamic MBean.
A1 - Method getAttribute( )
public java.lang.object
    getAttribute (java.lang.String attribute)
Parameter : attribute - The name of the attribute to be retrieved.
Returns <attribute"> - the value of the attribute retrieved.
Throws : AttributeNotFoundException -
    MBeanException -
    ReflectionException -
        It obtains the value of a specific attribute of the dynamic MBean.
        It returns a value of this attribute retrieved or, if it can not,
        it throws a message of one of the possible exceptions.
A2 - Method setAttribute( )
public void
    setAttribute (Attribute attribute)
Parameter : Attribute -    The identification of the attribute
                              to be set and the value it is to be set to.
Throws : AttributeNotFoundException -
    InvalidAttributeException -
    MBeanException -
    ReflectionException -
        It sets the value of a specific attribute of the dynamic MBean. It
        returns a value of this attribute retrieved or, if it can not, it
        throws a message of one of the possible exceptions.
A3 - Method getAttributes( )
public Attributelist
    getAttributes (java.lang.stringt[] attributes)
Parameter : attributes - A list of the attributes to be retrieved.
Returns : The list of attributes retrieved.
    It enables the values of several attributes of the dynamic MBean.
    It returns the list of attributes retrieved.

EXHIBIT A-continued

Methods of the DynamicMBean Interface.

A4 - Method setAttributes( )
public AttributeList
    setAttributes (AttributeList attributes)
Parameters : name - The object name of the MBean within which the
attributes are to be set.
attributes - A list of attributes : the identification of the
attributes to be set and the values they are to be set to.
Returns : The list of attributes that were set, with their new values.
    It sets the value of several attributes of the dynamic MBean. It
    returns the list of attributes with their flaw values.
A5 - Method Invoke( )
publicjava.lang.object
    invoke (java.lang.String actionName,
        java.lang.Object[] params,
        java.lang.String[] signature)
Parameters : actionName - The name of the action to be invoked.
params - An array containing the signature of the action. The
classobjects will be londed through the same class loader as the one used
for loading the MBean on which the action is invoked.
Returns : The object by the action, which represents the result of invoking
the action on the MBean specified.
Throws : MBeanException -
    ReflectionException -
    It allows an action to be invoked on the Dynamic MBean. The action
returns an object, which represents the result of invoking the action on the
MBean specified.
A6 - Method getMBeanInfo( )
public MBeanInfo
    getMBeanInfo( )
Returns: an instance of MBeanInfo allowing all attributes and actions
    exposed by this dynamic MBean to be retrieved.

EXHIBIT A-continued

Methods of the DynamicMBean Interface.

It provides the exposed attributes and actions of the dynamic MBean
using an MBeanInfo object.

EXHIBIT B

Main components of the MBeanInfo Object.

B1 - getAttributes( )

It returns the attributes as specified by the JavaBeans naming convention
for finding attributes e.g. if the operation pair int getPort( ) and void
setPort(int Port) are found, it shall be assumed that an attribute called
"Port" exists in this object.
One can optionally specify deep or shallow introspection, which means
apply this rule only to methods defined by this object (deep) or apply the
rule to all methods of this object and those inherited by ancestors objects
of this object.
B2 - getOperations( )

All other public methods not considered part of the attribute pair are
considered to be operations which are returned. One can optionally specify
deep or shallow introspection, which means apply this rule only to
methods defined by this object (deep) or apply the rule to all methods of
this object and those inherited by ancestor objects of this object.
B3 - getConstructors( )

It simply returns the constructors of the automanaged object, unchanged,
in the MBeanInfo object.
Further components are noted in figure 11A to detail the type of
information which can be found in MBeanInfo object.

EXHIBIT C

Java code for building, introspecting and managing a non-MBean object wrapped in an AutoManager.

```
/**
*
* The subtitles are added for convenience in description.
*
*/
import javax.management.DynamicMBean;
import javax.managementAttribute;
import javax.management.AttributeList;
import javax.management.MBeanInfo;
import javax.management.MBeanAttributeInfo;
import javax.management.MBeanConstructorInfo;
import javax.management.MBeanOperationInfo;
import javax.management.MBeanNotificationInfo;
import javax.management.AttributeNotFoundException;
import javax.management.MBeanException;
import javax.management.InvalidAttributeValueException;
import javax.management.ReflectionException;
import java.util.ArrayList;
import java.util.Enumeration;
import java.util.Hashtable;
import java.util.Date;
import java.lang.reflect.Constructor,
import java.lang.reflect.Method;
import java.io.*;
C- Class AutoManager
public class AutoManager extends Object implements DynaxnicMBean, Serializable {
private Object object;
private String description="Automatically managed class";
private Hashtable attributes;
private ArrayList attributeInfo;
private ArrayList constructors;
private Arraylist operations;
private ArrayList notifications;
private MBeanInfo mbeanInfo=null;
```

EXHIBIT C-continued

Java code for building, introspecting and managing a non-MBean object wrapped in an AutoManager.

```java
private ArrayList methods;
private boolean deepIntrospect; // if true, will expose everything about the automanaged object
C1a - AutoManager constructor
public AutoManager(Object object,boolean deepIntrospect) {
   expire( );
   this.deepIntrospect = deepIntrospect;
   this.object = object;
   getMethodList( );
   buildConstructors( );
   buildNotifications( );
   buildOperators( );
   buildAttributes( );
   }
C2a - getMethodList( )
private void getMethodList( ) {
   Method[] methodsL;
   if (deepIntrospect)
      methodsL = object.getClass( ).getMethods( );
   else
      methodsL = object.getClass( ).getDeclaredMethods( );
   methods = new ArrayList(methodsL.length);
   for (int i = 0; i < methodsL.length; i++)
      methods.add(methodsL[i]);
   }
C3a - getAttributeName( )
private String getAttributeName(Method method) {
   String name = method.getName( );
   if ((name.startsWith("get"))|
      (name.startsWith("set")))
      return name.substring(3,name.length( ));
   if (name.startsWith("is"))
      return name.substring(2,name.length( ));
   return null;
   }
C4a - getSetter( )
private Method getSetter(String att_name) {
   Method method;
   for (int i = 0; i < methods.size( ); i++) {
      method = (Method)methods.get(i);
      if (method.getName( ).equals("set" + att_name))
         return method;
      }
   return null;
   }
C5a - getGetter( )
private Method getGetter(String att_name) {
   Method method;
   for (int i = 0; i < methods.size( ); i++) {
      method = (Method)methods.get(i);
      if (method.getParameterTypes( ).length==0) {// can't have params in a getter
         if (method.getName( ).equals("get" +att_name))
            return method;
         if (method.getName( ).equals("is"+att_name))
            return method;
         }
      }
   return null;
   }
C6a - buildAttributes( )
private void buildAttributes( ) {
   attributes = new Hashtable( );
   attributeInfo = new ArrayList( );
   Method method, getter, setter;
   String att_name;
   for (int i = 0; i < methods.size( ); i++) {
      method = (Method)methods.get(i);
      if (((att_name=getAttributeName(method))!=null)&&
         (method.getParanieterTypes( ).length==0)){
         getter = getGetter(att_name);
         setter = getSetter(att_name);;
         try {
         attributeInfo.add(new MBeanAttributeInfo(att_name,
         "AutoManager exposed attribute",
         getter,
         setter));
```

EXHIBIT C-continued

Java code for building, introspecting
and managing a non-MBean object wrapped in an
AutoManager.

```
            methods.remove(getter);
            methods.remove(setter);
          }
          catch (Exception e) {
    //System.out.println("Turns out it's not an attribute:"+att_name+"-"+e.getMessage( ));
          }
        }
      }
    }
C7a - buildConstructors( )
private void buildConstructors( ) {
    Constructor constructorsL[] = object.getClass( ).getConstructors( );
    constructors = new ArrayList( );
    for (int i = 0; i < constructorsL.length; i++)
        constructors.add(new MBeanConstructorInfo("Automanaged exposed
constructor",constructorsL[i]));
    }
/**
 * Any methods left in the method list will be
 * treated as operators.
 */
C8a - buildOperators( )
private void buildOperators( ) {
    operations = new ArrayList( );
    Method method;
    for (int i = 0; i < methods.size( ); i++) {
        method = (Method)methods.get(i);
        operations.add(new MBeanOperationInfo("AutoManager exposed operation",method));
    }
}
C9a - buildNotifications( )
private void buildNotifications( ) {
    notifications = new ArrayList( );
    }
// utility methods for determining attributes
b-dynamic MBean Implementati n in the AutoManager
C1b - getAttribute( )
public java.lang.Object getAttiibute(java.lang.String attribute)
    throws AttributeNotFoundException,
        MBeanException,
        ReflectionException {
    try {
        Method methodList[];
        if (deepIntrospect)
            methodList = object.getClass( ).getMethods( );
        else
            methodList = object.getClass( ).getDeclaredMethods( );
        for (int i = 0; i < methodList.length; i++) {
            if (methodList[i].getParameterTypes( ).length==()) {
                if (methodList[i].getName( ).equals("get"+attribute)){
                    return methodList[i].invoke(object,null);
                }
                if (methodList[i].getName( ).equals("is"+attribute)) {
                    return methodList[i].invoke(object,null);
                }
            }
        }
    }
    catch (Exception ex) {
        throw new ReflectionException(ex);
    }
    throw new AttributeNotFoundException(attribute);
    }
C2b - setAttribute( )
public void setAttribute(Attribute attribute)
    throws AttributeNotFoundException,
        InvalidAttributeValueException,
        MBeanException,
        ReflectionException {
    try {
        Object args[] = new Object[1];
        args[0] = attribute.getValue( );
        Method methodList[];
        if (deepIntrospect)
            methodList = object.getClass( ).getMethods( );
```

EXHIBIT C-continued

*Java code for building, introspecting and managing a non-MBean object wrapped in an AutoManager.*

```
          else
            methodList = object.getClass( ).getDeclaredMethods( );
          for (int i = 0; i < methodList.length; i++) {
            if (methodList[i].getName( ).equals("set"+attribute)) {
              methodList[i].invoke(object,args);
              return;
            }
          }
        }
      catch (Exception ex) {
        throw new ReflectionException(ex);
        }
      throw new AttributeNotFoundException(attribute.getName( ));
      }
C3b - getAttributes( )
public AttributeList getAttributes(java.lang.String[] attributes) {
    AttributeList result = new AttributeList(attributes.length);
    for (int i = 0; i < attributes.length; i++) {
      try {
        result.add(new Attribute(attributes[i],getAttribute(attributes[i])));
        }
      catch (Exception ex) {
        System.out.println("Error getting attribute:"+attributes[i]);
        }
      }
    return result;
    }
C4b - setAttribute( )
public AttributeList setAttributes(AttributeList attributes) {
    AttributeList result = new AttributeList(attributes.size( ));
    for (int i = 0; i < attributes.size( ); i++) {
      try {
        setAttribute((Attribute)attributes.get(i));
        result.add(getAitribute(((Attribute)attributes.get(i)).getName( )));
        }
      catch (Exception ex) {
        ex.printStackTrace( );
        }
      }
    return result;
    }
C5b - inv ke( )
public java.lang.Object invoke(java.lang.String actionName,
                   java.lang.Object[] params,
                   java.lang.String[] signature)
     throws MBeanException,
        ReflectionException {
    try {
      ClassLoader cl = object.getClass( ).getClassLoader( );
      Class sigarray[];
      if (signature==null)
        sigarray = new Class[0];
      else
        sigarray = new Class[signature.length];
        for (int i = 0; i < sigarray.length; i++) {
          try {
            sigarray[i] = cl.loadClass(signature[i]);
            }
          catch (Throwable e) {
            sigarray[i] = Utils.getClass(signature[i]); // if it's a primitive, the
classloader will fail
            }
          }
      Method method = object.getClass( ).getMethod(actionName,sigarray);
      return method.invoke(object,params);
      }
    catch (Exception e) {
      e.printStackTrace( );
      throw new MBeanException(e);
      }
    }
C6b - getMBeanInfo( )
public MBeanInfo getMBeanInfo( ) {
    if (mbeanInfo==null) {
      MBeanAttributeInfo t1[] = new MBeanAttributeInfo[attributeInfo.size( )];
```

EXHIBIT C-continued

*Java code for building, introspecting and managing a non-MBean object wrapped in an AutoManager.*

```
    for (int i = 0; i < t1.length; i++)
      t1[i] = (MBeanAttributeInfo)attributeInfo.get(i);
    MBeanConstructorInfo t2[] = new MBeanConuctorInfo[constructors.size( )];
    for (int i = 0; i < t2.length; i++)
      t2[i] = (MBeanConstructorInfo)constructors.get(i);
    MBean(OperationInfo t3[] = new MBeanoperationInfo[operations.size( )];
    for (int i = 0; i < t3.iength; i++)
      t3[i] = (MBeanOperationInfo)operations.get(i);
    MBeanNotificationInfo t4[] = new MBeanNotificationInfo[notifications.size( )];
    for (int i = 0; i < t4.length; i++)
      t4[i] = (MBeanNotificationInfo)notifications.get(i);
    return mbeanInfo = new MbeanInfo(object.getClass( ).getName( ), description,
      t1, t2, t3, t4);
    }
  else {
    return mbeanInfo;
    }
  }
}
```

Exhibit I.1—Foundation Classes

The foundation classes describe objects which may be used e.g. as the type of arguments, or returned values in methods of various APIs. The foundation classes described in this Exhibit are:

A—ObjectName

B—ObjectInstance

C—Attribute and AttributeList

D—JMX exceptions

Other classes may also be considered as foundation classes; they are described in "Attribute Change Notifications" (section B of Exhibit I.2):

MBeanInfo, MBeanDataDescriptor, MBeanMethodDescriptor, MBeanNotificationDescriptor A.—Object Name It uniquely identifies an MBean within an MBean server. Management applications use this object name to identify the MBean on which to perform management operations. The class "ObjectName" represents an object name which consists of two parts:

Domain Name

The domain name is a "String". It provides a structure for the naming space within a JMX agent or within a global management domain. The domain name part might be omitted in an object name, as the MBean server is able to manage a default domain. When an exact match is required (in the "Pattern Matching", described below), omitting the domain name will have the same result as using the default domain defined by the MBean server. How the domain name is structured is implementation-dependent. The domain name string may contain any characters except those which are object name separators or wildcards, namely the colon, comma, equals sign, asterisk or question mark. JMX always handles the domain name as a whole, therefore any semantic sub-definitions within the string are opaque to JMX.

Key Property List

The key property list enables the user to assign unique names to the MBeans of a given domain. A key property is a property-value pair, where the property does not need to correspond to an actual attribute of an MBean. The key property list must contain at least one key property, and any number of key properties whose order is not significant.

The String Representation of Names is now discussed. Object names are usually built and displayed using their string representation, which has the following syntax:

[domainName]:property=value[,property=value]* where the domain name may be omitted to designate the default domain.

The canonical name of an object is a particular string representation of its name where the key properties are sorted in lexical order. This representation of the object name is used in lexicographic comparisons performed in order to select MBeans based on their object name.

The possibility of Pattern Matching is now discussed.

Most of the basic MBean operations (for example, create, get and set attribute) need to uniquely identify one MBean by its object name. In that case, exact matching of the name is performed. On the other hand, for query operations, it is possible to select a range of MBeans by providing an object name expression. The MBean server will use pattern matching on the names of the objects. The matching features for the name components may be as follows:

Domain Name

The matching syntax is consistent with file globing, in other words:

\* matches any character sequence

? matches a single character

Key Property List

If the key property list is replaced by an '*', this will match all the objects in the selected domain(s). Otherwise all objects having the given key property list will be selected. If the given key property list ends with ',*', all objects having the given key property list as subsets of their key property list will be selected.

Pattern matching examples will now be given, assuming that the MBeans with the following names are registered in the MBean server:

MyDomain:description=Printer,type=laser

MyDomain:description=Disk,capacity=2

DefaultDomain:description=Disk,capacity=1

DefaultDomain:description=Printer,type=ink

DefaultDomain:description=Printer,type=laser,
date=1993
Socrates:description=Printer,type=laser,date=1993
Here are some examples of queries that can be performed using pattern matching:
"*:*" will match all the objects of the MBean server. A null or " " object name is equivalent to "*:*".
":*" will match all the objects of the default domain
"MyDomain:*" will match all objects in MyDomain
"??Domain:*" will also match all objects in MyDomain
"*Dom*:*" will match all objects in MyDomain and DefaultDomain
"*:description=Printer,type=laser,*"
will match the following objects:
MyDomain:description=Printer,type=laser
DefaultDomain:description=Printer,type=laser,
date=1993
Socrates:description=Printer,type=laser,date=1993
"*Domain:description=Printer,*"
will match the following objects:
MyDomain:description=Printer,type=laser
DefaultDomain:description=Printer,type=ink
DefaultDomain:description=Printer,type=laser,
date=1993

B.—ObjectInstance

The "ObjectInstance" class is used to represent the link between an MBean's object name and its Java class. It is the full description of an MBean within an MBean server, though does not allow you to access the MBean by reference.

The "ObjectInstance" class contains the following elements:
The Java class name of the corresponding MBean
The "ObjectName" registered for the corresponding MBean
A test for equality with another "ObjectInstance"
An "ObjectInstance" is returned when an MBean is created and is used subsequently for querying.

C—Attribute and AttributeList

An Attribute represents a pair: attribute and its value. It contains the attribute name string and a value in an "Object" class.

The following classes may be defined:
Class "Attribute" represents a single attribute-value pair,
Class "AttributeList" represents a list of attribute-value pairs.

The "Attribute" and "AttributeList" objects are typically used for conveying the attribute values of an MBean, as the result of a get operation, or as the argument of a set operation.

D—JMX Exceptions

Exceptions may be thrown by different methods of the JMX interfaces. This section describes what error cases may be encapsulated by such exceptions.

Exceptions mainly occur:
while the MBeanServer or JMX services perform operations on MBeans,
when the MBean code raises user defined exceptions.

The organization of the defined exceptions may be based on the nature (runtime or not) of the error case and on the location where it was produced (manager, agent, communication).

Exceptions raised by the agent will be discussed in more detail.

Figure 13:
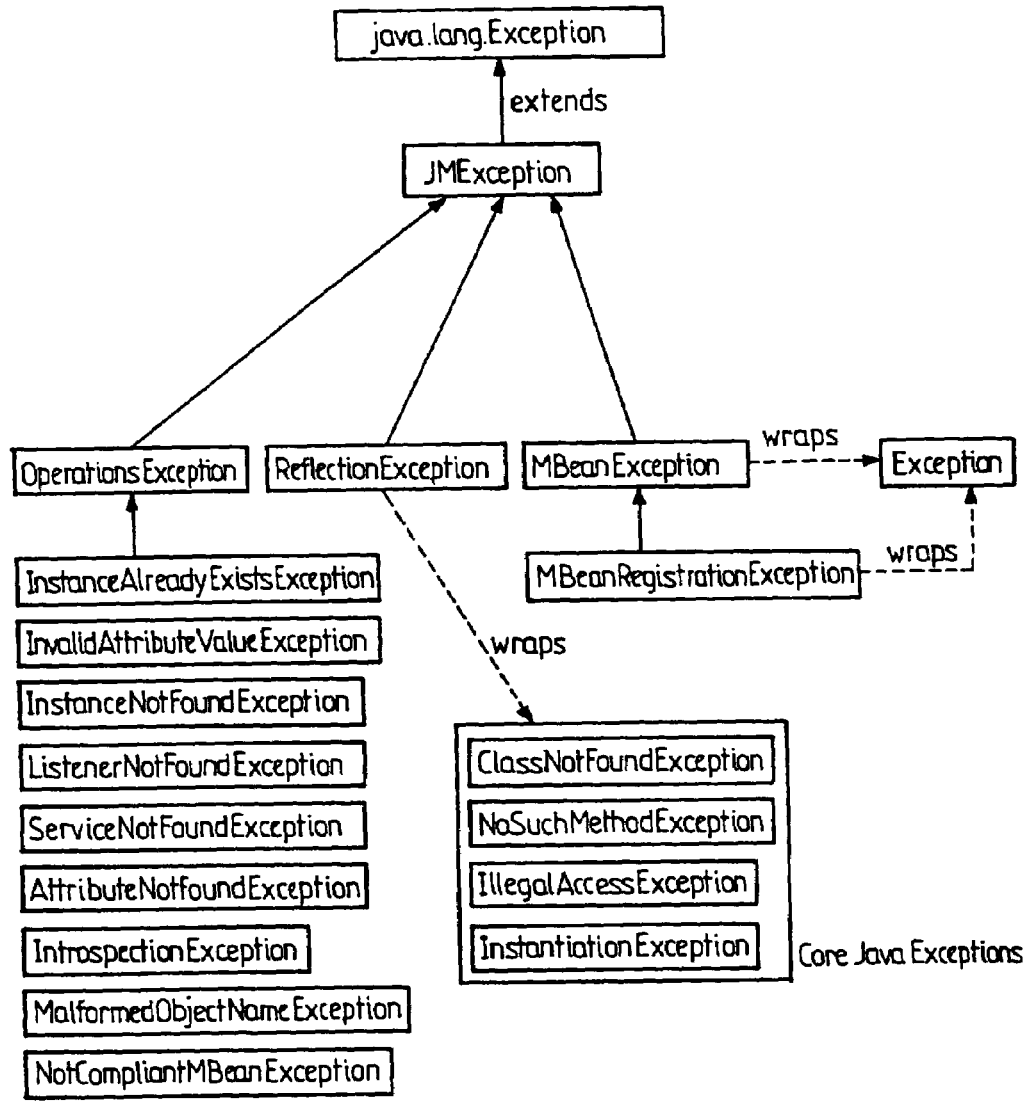
FIG. 13 is a tree diagram showing an object model for exceptions.

An exemplary JMX exception object model is shown as a tree in FIG. 13.

The base exception defined is named "JMException". It may e.g. extend the "java.lang.Exception class". The "JMException" represents all the exceptions thrown by methods of a JMX implementation.

Preferably, in order to specialize the "JMException" and to give information for the location of the exception's source, some subclass exceptions are defined. The first division is among:
OperationsException,
exceptions thrown while performing operations in general
ReflectionException
exceptions thrown during the use of the reflection API for invoking MBean methods, and
MBeanException
exceptions thrown by the MBean code.

The "ReflectionException" wraps the actual core Java exception thrown when using the reflection API of Java. The "MBeanException" may also wrap the actual user defined exception thrown by an MBean method (Exception).

Figure 14:
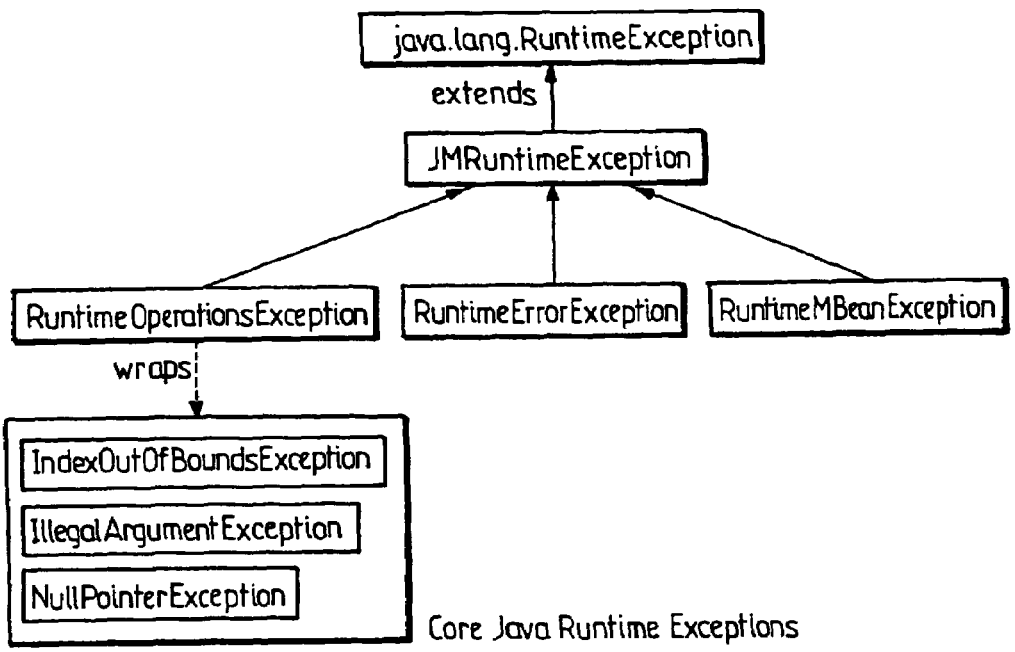
FIG. 14 is a tree diagram showing another object model for runtime exceptions.

An exemplary JMX RuntimeException Tree Diagram is shown in FIG. 14.

The base JMX runtime exception defined is named "JMRuntimeException" and it extends the "java.lang.RuntimeException" class. The "JMRuntimeException" represents all the runtime exceptions thrown by methods of a JMX implementation. Like the "java.lang.RuntimeException", a method of a JMX implementation is not required to declare in its "throws" clause any subclasses of "JMRuntimeException" that might be thrown during the execution of the method but not caught.

The "JMRuntimeException" is specialized into:
"OperationsRuntimeException" for representing the runtime exceptions thrown while performing operations in the agent,
"MBeanRuntimeException" representing the runtime exceptions thrown by the MBean code, and
"RuntimeErrorException" representing errors thrown in the agent re-thrown as runtime exceptions.

The conditions resulting in throwing each one of the JMX exceptions defined in FIG. 13, and/or in FIG. 14 will now be discussed in more detail.

JMException: This class represents exceptions thrown by JMX implementations. It does not include the runtime exceptions.

OperationsException: This class represents exceptions thrown in the agent when performing operations on MBeans.

ReflectionException: This class represents exceptions thrown in the agent when using the "java.lang.reflect" classes to invoke methods on MBeans. It "wraps" the actual "java.lang.Exception" thrown.

The following are the "java.lang.Exception" exceptions that may be "wrapped" in a "ReflectionException":

"ClassNotFoundException": Thrown when an application tries to load in a class through its string name using the "forName" method in class "Class".

"InstantiationException: thrown when an application tries to create an instance of a class using the "newInstance" method in class "Class", but the specified class object cannot be instantiated because it is an interface or is an abstract class.

"IllegalAccessException": thrown when an application tries to load in a class through its string name using the "forName" method in class "Class".

"NoSuchMethodException": thrown when a particular method cannot be found.

MBeanException: This class represents "user defined" exceptions thrown by MBean methods in the agent. It "wraps" the actual "user defined" exception thrown. This exception will be built by the MBean server when a call to an MBean method results in an unknown exception.

InstanceAlreadyExistsException: The MBean is already registered in the repository.

InstanceNotFoundException: The specified MBean does not exist in the repository.

InvalidAttributeValueException: The specified value is not a valid value for the attribute.

AttributeNotFoundException: The specified attribute does not exist or cannot be retrieved.

"IntrospectionException": An exception occurred during introspection of the MBean, i.e. the inspection of its management interface.

MalformedObjectNameException: The format or contents of the information passed to the constructor does not allow to build a valid ObjectName.

NotCompliantMBeanException: This exception occurs when trying to register an object which is not a JMX compliant MBean, in the MBean server.

ServiceNotFoundException: This class represents exceptions raised when a requested service is not supported.

MBeanRegistrationException: This class wraps exceptions thrown by the "preRegister( )", "preDeregister( )" methods of the MBeanRegistration interface.

JMRuntimeException: This class represents runtime exceptions emitted by JMX implementations.

RuntimeOperationsException: This class represents runtime exceptions thrown in the agent when performing operations on MBeans. It wraps the actual "java.lang.RuntimeException" thrown. Here are the "java.lang.RuntimeException" exceptions that may be "wrapped" in a "RuntimeOperationsException":

IllegalArgumentException: thrown to indicate that a method has been passed an illegal or inappropriate argument.

IndexOutOfBoundsException: thrown to indicate that an index of some sort (such as to an array, to a string, or to a vector) is out of range.

NullPointerException: thrown when an application attempts to use null in a case where an object is required.

RuntimeMBeanException: This class represents runtime exceptions thrown by MBean methods in the agent. It "wraps" the actual "java.lang.RuntimeException" exception thrown. This exception will be built by the MBeanServer when a call to an MBean method throws a runtime exception.

RuntimeErrorException: When a "java.lang.Error" occurs in the agent it should be caught and re-thrown as a "JruntimeErrorException".

Exhibit I.2—Notifications

A—MBean Notification Model

The management interface of an MBean allows its agent to perform control and configuration operations on the managed resources.

It has been observed that such management interfaces provide only part of the functionality necessary to manage complex, distributed systems. Most often, management applications further need to react to "management events", like a state change, or a specific condition when it occurs in an underlying resource.

Tools to this effect will now be described.

An "MBean Notification Model" is defined, allowing MBeans to broadcast such management events, which are called notifications.

In the same spirit as the JavaBeans event model, this notification model is based on an event/listener pair. However, the MBean notification model enables a listener to register only once and still receive all different events that may occur.

The MBean notification model may rely on the following components:

A1. a generic event type "Notification"

It can signal any type of management event. The "Notification" event may be used directly, or may be subclassed, depending on the information which needs to be conveyed with the event.

A2. a "NotificationListener" interface

It needs to be implemented by objects requesting to receive notifications sent by MBeans. Objects which receive notification events are called notification consumers.

A3. a "NotificationFilter" interface

It needs to be implemented by each MBean wanting to act as a notification filter. This interface lets notification consumers provide a filter to be applied to notifications emitted by an MBean.

A4. a "NotificationBroadcaster" interface

This interface allows notification consumers to register their interest in the notifications emitted by an MBean. By using a generic event type, this notification model allows any one consumer to receive all types of events from a source. In this way, a management application only needs to register once in order to receive all of the different events of an MBean.

A1—The "Notification" class extends the "EventObject" base class and defines the minimal information contained in a notification. It contains the following fields:

a notification type (identifier),
   a string expressed in a dot notation similar to Java properties, e.g. "network.alarm.router". Since many notifications are of the same Java event class, this type string characterizes the meaning of the notification.

a sequence number,
   a serial number identifying a particular instance of notification in the context of the notification source, a time stamp
   indicating when the notification was generated, a message contained in a string,
   It may be e.g. the explanation of the notification for displaying to a user userData
   an "Object" instance that is used for whatever other data the notification source wishes to communicate to its consumers.

Notification sources should use the identifier to indicate the nature of the notification to their consumers. When additional information needs to be transmitted to consumers, the source may place it in the message or userData fields. In most cases, this allows the sources and consumers to exchange instances of the "Notification" class. However, subclasses of the "Notification" class may be defined, e.g. when additional semantics are required within the notification object.

Notification identifiers are strings which should be interpreted as dot-separated components. This allows some structure in the naming of notifications. Some prefix reservation may be made: for example, all strings prefixed by "jmx." may be reserved for the notifications emitted by the components of the JMX infrastructure, such as "jmx.mbean.registered". Otherwise, MBeans are free to define all identifiers they wish to use when naming the notifications they emit.

Usually, MBeans will use identifiers that reflect their types of notifications within the larger management structure in which they are involved. For example, a vendor who provides JMX manageable resources as part of a management product might prefix all notifications with "vendorName".

Figure 10:
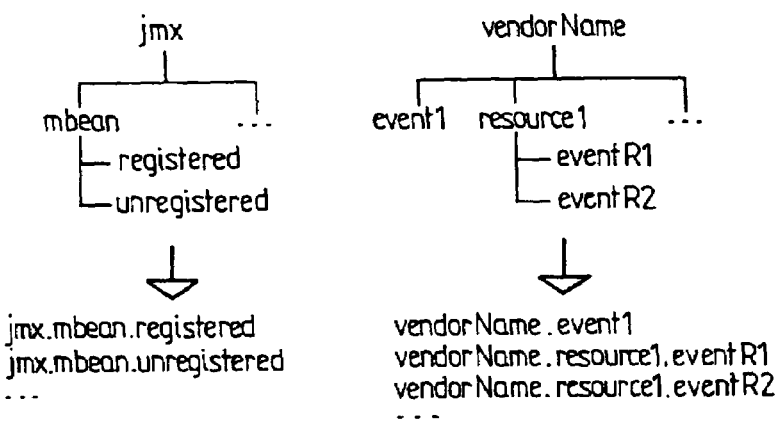
FIG. 10 illustrates an example of the dot notation.

FIG. 10 shows a tree representation of the structure induced by the dot notation in notification identifiers.

A2—The "NotificationListener" Interface may be implemented by objects interested in receiving notifications sent by MBeans. It defines a unique call-back method, "handleNotification", which will be invoked by an MBean when it emits a notification.

Besides the "Notification" object, a hand-back object is passed as an argument to the "handleNotification" method. This object is opaque to the MBean: it is provided by the consumer upon registration, the MBean stores it and hands it back to the consumer with each notification. Each consumer registered as a listener for a given notification source has a separate hand-back object which is only sent back to the consumer which registered it. This hand-back object can allow the consumer to retrieve some context information for use while processing the notification.

A3—The "NotificationFilter" Interface may be implemented by a MBean for acting as a notification filter. It defines a unique method, "isNotificationEnabled", which will be invoked by an MBean before it emits a notification.

Besides the "Notification" object and the "NotificationListener" object, a hand-back object is passed as an argument to the "is NotificationEnabled" method. This hand-back object is handled transparently by the MBean, and can allow the consumer to retrieve some context information.

A4—The "NotificationBroadcaster" Interface may be implemented by any MBean for acting as a notification source. It provides a pair of methods:

1. "addNotificationListener", which registers a consumer's interest in notifications sent by this MBean. This method takes a reference to a "NotificationListener" object, a reference to a "NotificationFilter" object as well as a hand-back object. The MBean has to maintain a table of listener, filter and hand-back triplets. When the MBean emits a notification, it invokes the "handleNotification" method of all the registered "NotificationListener" objects, with their respective hand-back object. If a "NotificationFilter" has been specified when registering the "NotificationListener" object, the MBean will invoke the "is NotificationEnabled" method before handling the notification. The same listener object may be registered more than once, each time with a different hand-back object. This means that the "handleNotification" method of this listener will be invoked several times, with different hand-back objects.

2. "removeNotificationListener", which allows a consumer to unregister itself from a notification source. This method takes a reference to a "NotificationListener" object, as well as a hand-back object. If the hand-back object is provided, only the entry corresponding to this listener and hand-back pair will be removed. The same listener object may still be registered with other hand-back objects. Otherwise, if the hand-back is not provided, all entries corresponding to the listener will be removed.

B—Attribute Change Notifications

A specific family of notifications, the attribute change notifications, allows management services and applications to be notified whenever the value of a given MBean attribute is modified.

In this model, the MBean has the full responsibility of sending notifications when an attribute change occurs. The mechanism for detecting changes in attributes and triggering the notification of the event is not part of the JMX specification. The attribute change notification behavior is therefore dependent upon each MBean's class implementation.

The MBean attribute change notification model relies on the following components:

B1. AttributeChangeNotification,

A specific event type, which can signal any attribute change event.

B2. AttributeChangeNotificationFilter

A specific filter support, which allows attribute change notification consumers to filter the notifications depending on the attributes of interest.

Like in the "MBean Notification Model", any MBean wishing to send attribute change notifications must implement the "NotificationBroadcaster" interface. Similarly, the "NotificationListener" interface has to be implemented by all objects interested in receiving attribute change notifications sent by an MBean.

B1—The "AttributeChangeNotification" class extends the "Notification" class and defines additional fields concerning the attribute which has changed:

name, type, old value and new value of the attribute

The notification type of attribute change notifications is preferably a special one, e.g. "JMX.attribute.change".

B2—The "AttributeChangeNotificationFilter" class implements the "NotificationFilter class and defines the following additional methods:

"enableAttribute( )",

It enables receiving notifications for the specified attribute name

"disableAttribute( )",

It disables receiving notifications for the specified attribute name.

Exhibit I.3—MBeanInfo Classes

The "MBeanInfo" Classes allow the management interface of an MBean to be described, in terms of its attributes, operations, constructors and notifications. These classes may be used both for the introspection of standard MBeans and for the self-description of dynamic MBeans.

The MBeanInfo classes may be used to discover the management interface of an MBean at run-time, even from outside the JMX agent where the class of the MBean is registered, for example, from a remote Java management application.

The following classes define the information for an MBean's management interface:

1. MBeanInfo lists the attributes, operations, constructors and notifications

2. MBeanMethodDescriptor describes an operation or constructor

3. MBeanDataDescriptor describes an attribute or method parameter

4. MBeanNotificationDescriptor describes a notification

The UML diagram of FIG. 11 shows the relationship between these classes as well as the components of each. The classes will now be described.

1.—The "MBeanInfo" class (FIG. 11) is used to describe an MBean, its attributes, operations and constructors. In addition, when the MBean is a notification source, its notification types are also described in this class.

Its operations and constructors are described using the "MBeanMethodDescriptor" class and its attributes are described using the "MBeanDataDescriptor" class. The methods that are essential to the open MBean patterns are the "getDescription" and "is OpenMBean" methods.

The "getDescription( )" method must be used to return a string describing the MBean that is suitable for displaying to a user in a GUI. It should describe the MBean's purpose and its functionality, if applicable.

The "is OpenMBean( )" method indicates whether or not the MBean being described conforms to the open MBean specification, as described in "Open MBean Requirements". MBeanInfo objects are either created or verified by the MBean server in such a way as to guarantee that "isOpenMBean( )" returns the proper value: true if the MBean conforms to this open MBean specification and false otherwise.

The "MBeanDataDescriptor" class is used to describe an attribute, method return value, or method argument. This type may be used to generically describe any class.

The "getType( )" method returns a string which identifies the Java type of the object being described. The "getname( )" method returns the object's name, also as a string, e.g. as follows:

For attributes, it is the attribute name.
For method returns this name serves as an abbreviated description.
For method arguments, the name uniquely identifies an argument and also serves as an abbreviated descriptor.

A qualitative description of the parameter is provided the "getDescription( )" method. The "getDefaultValue( )" method may be used to indicate a default value for this parameter. This is particularly useful when describing a method argument since this value can be used as a default if the invoker has no particular preference for some argument.

The "getLegalValues( )" method may be used to return a list of permissible values. This is useful for writable attributes and method arguments so the user may be presented with a list of reasonable or legal choices when editing them. For readable attributes and method returns, this method provides a list of legal values that may be expected. If a set of legal values is supplied, then the MBean server will validate that the values exchanged are a member of this set.

The methods "getDefaultValue( )" and "getLegal Values( )" return either "Object" or "Object[ ]" types. In order to support remotability, the actual types must be limited. These methods, therefore, should preferably only be used in the context of open MBeans, to insure that these methods return only basic data types for open MBeans.

The name returned by the "getName( )" method is required for identifying attributes, but it is not essential for return values and arguments of non-open MBeans. However, "getName( )" remains a required method of MBeanInfo for the sake of consistency and to promote class reuse. As such, it must always return a non-empty string.

When used for return values and method arguments, the MBean server introspection mechanism will use "return" and "argumentN" as names unless overridden by getMBean Info( ) of standard MBeans. In the name "argumentN", N is a number indicating the position of the argument. This provides the required uniqueness for method argument names.

The "MBeanDataDescriptor" class will be used to describe basic data types for open MBeans. Subclasses of "MBeanDataDescriptor" may be used to describe non basic data types for open MBeans. For example, "Composite-DataDescriptor" or "TabularDataDescriptor" are suitable when describing "CompositeData" or "TabularData" classes, respectively.

2.—The "MBeanMethodDescriptor" class describes an individual method, either a constructor or an operation. The return value and argument parameters are described using the "MBeanDataDescriptor" class. The method arguments must all have unique names, that is the set of "MBeanDataDescriptor" objects describing the arguments of a single method must all have different names as returned by their "getName( )" method.

The "getDescription( )" method is used to return a string describing the operation performed by this method. It should be suitable for displaying to a user in a GUI. It should describe what this method does.

The "getImpact( )" method returns an integer that can be mapped using the static variables of this class. Its purpose is to communicate the impact this method (operation) will have on the managed entity represented by the MBean. "INFO" is used to indicate the operation is a read-like in nature, and that it would return some information without modifying the MBean. "ACTION" is used to indicate that the operation is write-like and would modify the MBean in some way, typically by writing some value or changing a configuration.

"ACTION_INFO" indicates that this method is a read/write operation. Impact information is very useful for making decisions on which operations to expose to users at different times. It can also be used by some security schemes.

3.—An "MBeanNotificationDescriptor" class is used to describe a notification that is sent by an MBean. A notification is identified by it type string and its class name, optionally, it may also have a description string. The "getType( )" method returns the string containing the notification's type. This the identifier of the notification, containing any number of elements in dot notation. The "getClassName( )" method returns the Java class name that implements the given notification object. The notification's class name may provide further information about the meaning of the triggering event. For example, it might be used when selecting notifications during filtering.

FIG. 11A illustrates an alternative embodiment of the MBeanInfo class, having:
- a common class "MbeanFeatureInfo", which is extended to provide name and description to other classes.
- a single "getattributes( )" in the main MbeanInfo class, with another class "MbeanAttributeInfo" for accessing details on attributes.
- an "MbeanParameterInfo" class, for details on "getSignature( )", which now contains the "getArguments( )" of FIG. 11.
- more generally, a specific class for each of the methods in the main MbeanInfo class, while they shared "MbeanMethodDescriptor" or "MbeanDataDescriptor" in the embodiment of FIG. 11.

Exhibit II.1—Standard MBeans

In order to be manageable through a JMX agent, a standard MBean explicitly defines its management interface. In some cases the management interface may be the whole public interface of the Java class, but most of the time, it will only be a subset of the public interface.

To be a JMX manageable resource, the Java class of a standard MBean must implement a Java interface which is named after the class.

This constraint may also satisfied if one of the MBean's superclasses implements a Java interface named after itself (the superclass).

This interface defines the handles on the resource that are exposed for management. Only the public methods contained in this interface are exposed for management. Since interfaces may also extend parent interfaces, all public methods in the inheritance tree of the interface are also considered. All the methods of the Java class which are not listed in this interface are not accessible to a management application.

This mechanism is described in further detail in "Inheritance Patterns".

Standard MBeans rely on a set of naming rules, called design patterns, that should be observed when defining the interface of their Java object. These naming rules define the concepts of attributes and operations which are inspired by the JavaBeans component model. However, the actual design patterns for JMX take into consideration the inheritance scheme of the MBean, as well as lexical design patterns to identify the management interface. As a result, the design patterns for MBeans are specific to the JMX specification.

The management interface of a standard MBean is composed of:

its attributes, i.e. the properties which are exposed through "getter" and "setter" methods, its operations, i.e. the remaining methods exposed in the MBean interface.

The process of inspecting the MBean interface and applying these design patterns is called introspection. The JMX agent uses introspection to look at the methods and superclasses of a class, determine if it represents an MBean that follows the design patterns, and recognize the names of both attributes and operations.

The management interface of the MBean is specified by implementing a Java interface whose name is formed by adding the "MBean" suffix to the MBean's Java class name. For example, the Java class "MyClass" would implement the "MyClassMBean" interface. This interface mentions the complete signatures of the methods exposed.

The "MyClassMBean" interface may list methods defined in "MyClass" as well as methods which "MyClass" inherits from its superclasses. This enables the user to subclass and to instrument certain classes whose Java source code is inaccessible.

MBeans also inherit instrumentation from their superclasses. If "MySuperClass" is an MBean and "MyClass" extends "MySuperClass" then "MyClass" is also an MBean. If "MyClass" does not implement a "MyClassMBean" interface, then it will have the same management interface as "MySuperClass". Otherwise, "MyClass" can re-define its management interface by implementing a "MyClassMBean" interface.

Having to implement an MBean interface is the main constraint put on an MBean to be a JMX manageable resource.

A "MyClass" Example Mbean will now be described.

CODE EXAMPLE CE-2 gives a basic illustration of the explicit definition of the management interface for the MBean of class "MyClass". Among the public methods defined in its Java class, only "getHidden" and "setHidden" will not be part of the management interface of the "MyClass" MBean.

The lexical patterns for attribute and operation names rely on the names of methods in the MBean's Java code. They enable a JMX agent to identify which attributes and operations are exposed for management in a standard MBean. They also allow the agent to make the distinction between readable, writable and readable-writable attributes.

Attributes are the fields or properties of the MBean which are in its management interface. Attributes are discrete, named characteristics of the MBean which define its appearance or its behavior, or are characteristics of the managed resource that the MBean instruments. For example, an attribute named "ipackets" in an MBean representing an Ethernet driver could be defined to represent the number of incoming packets.

Attributes are always accessed via method calls on the object that owns them. For readable attributes, there is a getter method to read the attribute value. For writable attributes, there is a setter method to allow the attribute value to be updated. By default, the following design pattern is used for identifying attributes:

if a class definition contains a matching pair of "getAttributeName" and "setAttributeName" methods that take and return the same type, these methods define a readable and writable attribute called "AttributeName".

if a class definition contains only one of these methods, the method defines either a readable or writable attribute.

However, another design pattern might supersede the above described default design pattern. The non default design pattern may be defined e.g. in the MBean interface class.

The "AttributeType" may be any Java type, or an array of any Java type, provided that this type is valid in the MBean's run-time context or environment. When the type of an attribute is an array type, the getter and setter methods operate on the whole array. The design patterns for indexed attributes do not include any getter or setter method for accessing individual array elements. Such access methods must be implemented as MBean operations.

In addition, for boolean type attributes, it is possible to define a getter method using the following design pattern:

public AttributeType getAtributeName( );
public void setAttributeName(AttributeType value);
public boolean is AttributeName( );

Preferably, in order to reduce redundancy, only one of the two getter methods for boolean types is allowed. An attribute may have either an "isAttributeName" method or a "getAttributeName" method, but not both in the same MBean.

Operations are the actions that a JMX manageable resource makes available to management applications. These actions can be any computation which the resource wishes to expose, and they can also return a value.

In a standard MBean, an operation is a Java method specified in its interface and implemented in the class itself. Any method in the MBean interface which does not fit an attribute design pattern is considered to define an operation.

A typical usage is shown in CODE EXAMPLE CE-2 in Exhibit IV, where the MBean exposes the "reset" method to re-initialize its exposed attributes and private fields. Simple operations can also be written to access individual elements of an indexed attribute.

It may be decided that all attribute and operation names derived from these design patterns are case-sensitive. For example, this means that the methods "getstate( )" and "setstate( )" define two attributes, one readable called "state", and one writable called "State".

While case sensitivity applies directly to component names of standard MBeans, it is also applicable to all component names of all types of MBeans, standard or dynamic. In general all names of classes, attributes, operations, methods, and internal elements are case sensitive, whether they appear as data or as functional code when they are manipulated by management operations.

Exhibit II.2—Dynamic MBeans

A—Method signatures of a DynamicMBean

The methods are as follows:

MBeanInfo getMBeanInfo( )

Object getAttribute(String attribute)
AttributeList getAttributes(String[ ] attributes)
void setAttribute(Attribute attribute)
AttributeList setAttributes(AttributeList attributes)
Object invoke(String operationNane, Object[ ] params, String[ ] signature).

The methods are defined in more detail as follows:

getMBeanInfo Method
    This method returns an "MBeanInfo" object which contains the definition of the MBean's management interface. Conceptually, dynamic MBeans have both attributes and operations, only they are not exposed through method names. Instead, dynamic MBeans expose attribute names and types and operation signatures through the return value of this method at runtime. This return value is of type "MBeanInfo", which contains a list of attribute names and their types, a list of operations and their parameters, and other management information. This type and its helper classes are further described in "MBeanInfo Classes" in Exhibit I.3.

getAttribute and getAttributes Methods
    These methods take either an attribute name or a list of attribute names and return the value of the corresponding attribute(s). These are like a standard getter method, except the caller supplies the name of the attribute requested. It is up to the implementation of the dynamic MBean to properly map the exposed attributes names to their values through these methods. The classes which describe attribute names, values and lists of names and values are described in "Attribute and AttributeList" in Exhibit I.1. These data types are also used by the "setAttribute" methods below.

setAttribute and setAttributes Methods
    These methods take attribute name-value pairs and, like standard setter methods, they write these values to the corresponding attribute. When setting several attributes at a time, the list of values is returned to indicate those for which the write operation succeeded. Again, it is up to the implementation of the dynamic MBean to properly map the new values to the internal representation of their intended attribute target invoke Method
    The invoke method lets management applications call any of the operations exposed by the dynamic MBean. Here the caller must provide the name of the intended operation, the objects to be passed as parameters, and the types for these parameters. By including the operation signature, the dynamic MBean implementation may verify that the mapping is consistent between the requested operation and that which is exposed. If the requested operation is successfully mapped to its internal implementation, this method returns the result of the operation. The calling application will expect to receive the return type exposed for this operation in the "MBeanInfo" method.

B. Behavior of Dynamic MBeans

When registered in an agent, a dynamic MBean is treated in exactly the same way as a standard MBean. Typically, a management application will first obtain the management interface through the "getMBeanInfo" method, in order to have the names of the attributes and operations. The application will then make calls to getters, setters and operations of the dynamic MBean.

In fact, the interface for dynamic MBeans is similar to that of the MBean server in the agent (see Exhibit III). A dynamic MBean provides the management abstraction that the MBean server provides for standard MBeans. This is why management applications can manipulate both kinds of MBeans indifferently: the same management operations are applied to both. In the case of the standard MBean, the MBean server uses introspection to find the management interface and then call the operations requested by the manager. In the case of the dynamic MBean, these tasks are taken over by the dynamic MBean's implementation. This delegation entails both flexibility of the resource and mapping responsibilities to ensure coherence.

From the application's perspective, how the dynamic MBean implements the mapping between the declared management interface and the returned attribute values and operation results is not important it only expects the advertised management interface to be available. This gives much flexibility to the dynamic MBean to build more complex data structures, expose information which it can gather off-line, or simply provide a wrapper for resources not written in the Java programming language.

Exhibit III—Managed Bean Server (MBean Server)

The Managed Bean Server, or MBean server, is an important component of the Agent infrastructure. The MBean server, which acts as a registry for MBeans in the agent, is the component which provides the services for manipulating MBeans. In fact, all management operations performed on the MBeans may be done through the MBeanServer interfaces.

In general, the following kinds of MBeans would be registered in an MBean server:

MBeans which represent managed resources for management purposes. These resources may be of any kind: application, system, or network resources which provide a Java interface or a Java wrapper.

MBeans which add management functionality to the agent. This functionality may be fully generic, providing for instance a logging of a monitoring capability, or it may be specific to a technology or to a domain of application. Some of these MBeans are defined herein, others may be provided by management application developers.

Some components of the infrastructure, for example, the protocol adaptors may be themselves implemented as MBeans. This allows such components to benefit from the dynamic management infrastructure.

A.—Registration of MBeans

The MBean server is firstly a registry, in which MBeans may be registered either by a management application, or by other MBeans. The interface of the MBeanServer class may allow two different kinds of registration:

Registration of an MBean upon its instantiation of a new MBean
        In this case, the loading of the java class of the MBean can be done either by using a default class loader, or by explicitly specifying the class loader to use.

Registration of an already existing MBean.

An object name is assigned to an MBean when it is registered. The object name is a string whose structure is defined in detail in ObjectName in Exhibit I.1. The object name allows an MBean to be identified uniquely in the context of the MBean server. This unicity is checked at registration time by the MBean server, which will refuse MBeans with duplicate names.

B.—MBean Registration Control

Optionally (if the MBean developer chooses it), the MBean server may implement the "MBeanRegistration" interface, comprising one or more of the following methods:

—preRegister— this is a call-back method that the MBeanServer will invoke before registering the MBean. The MBean will not be registered if any exception is raised by this method. This method may throw the "MBeanRegistrationException" which will be re-thrown as is by the MBean server. Any other exception will be caught by the MBean server, encapsulated in an "MBeanRegistrationException" and re-thrown. This method may be used to:

Allow an MBean to keep a reference on its MBean server.

Perform any initialization that needs to be done before the MBean is exposed to management operations.

Perform semantic checking on the object name, and possibly provide a name if the object was created without a name.

Get information about the environment, for instance, check on the existence of services the MBean depends upon. When such required services are not available, the MBean might either try to instantiate them, or raise a "ServiceNotFoundException" exception.

—postRegister— this is a call-back method that the MBean server will invoke after registering the MBean. Its boolean parameter will be true if the registration was done successfully, and false if the MBean could not be registered.

—preDeregister— this is a call-back method that the MBean server will invoke before de-registering an MBean. This method may throw an "MBeanRegistrationException", which will be re-thrown as is by the MBean server. Any other exception will be caught by the MBean server, encapsulated in an "MBeanRegistrationException" and re-thrown. The MBean will not be de-registered if any exception is raised by this method.

—postDeregister— this is a call-back method that the MBean server will invoke after de-registering the MBean.

Figure 15:
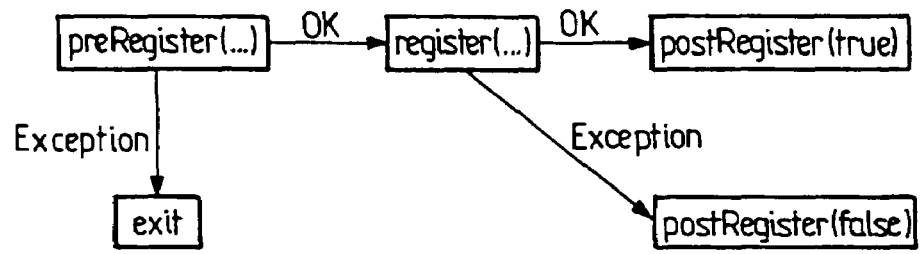
FIGS. 15 and 16 are flow charts showing the way of calling the registration and de-registration methods of an "MBean-Registration" interface.
Figure 16:
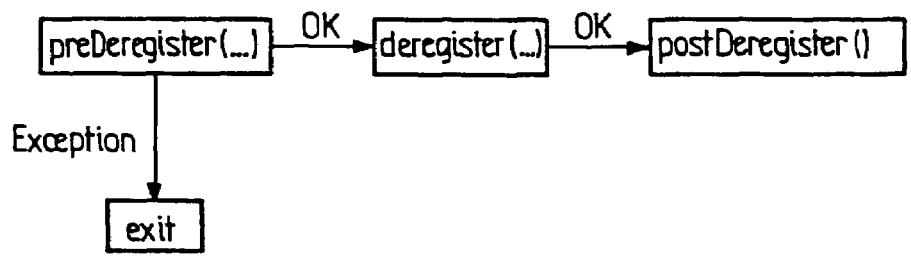

FIGS. 15 and 16 describe the way the methods of the "MBeanRegistration" are called by the "MBeanServer" class when an MBean registration or a de-registration is performed. The methods illustrated with a thick border are MBeanServer methods, the others are implemented in the MBean.

Thus, by implementing the "MBeanRegistration" interface, the MBean developer may exercise some control upon the registering/unregistering of the MBean in the MBean server. Before and after registering and deregistering an MBean, the MBean server checks dynamically whether the MBean implements the "MBeanRegistration" interface. If this is the case, the appropriate call-backs are invoked.

Implementing this interface is also the only means by which MBeans can get a reference to the MBeanServer with which they are registered. This means that they are aware of their management environment and become capable of performing management operations on other MBeans.

C.—Operations on MBeans

The interface of the "MBeanServer" class allows the following management operations to be performed on registered MBeans:

Retrieve a specific MBean by its object name.

Retrieve a collection of MBeans, by means of a pattern matching on their names, and optionally by means of a filter applied to their attribute values.

Get one or several attribute value(s) of an MBean.

Invoke an operation on an MBean.

Discover the management interface of an MBean, that is, its attributes and operations. This is what is called the introspection of the MBean.

Register interest in the notifications emitted by an MBean.

D.—MBeanServer Delegate Object

The MBeanServer defines a domain called "JMImplementation" in which one object of class MBeanDelegateObject is registered: This object identifies and describes the MBeanServer in which it is registered. It also allows handles the notifications emitted by the MBeanServer. In other words, this MBean acts as a delegate for the MBeanServer which it represents.

The complete object name of this delegate object is specified by JMX, as follows: "JMImplementation:type=MBeanServerDelegate".

The delegate object provides the following information about the MBeanServer:

The MBeanServerId, which has a value of type String. It identifies the agent. The format of this string is not specified.

The MBeanServerVersion, which has a value of type String. It identifies the version of the JMX Agent Specification on which this MBeanServer implementation is based. For this version of the Specification, the jmxVersion string is "2.0".

The MBeanDelegateObject class implements the NotificationBroadcaster interface and sends the MBeanServerNotifications that are emitted by the MBean server. Object wishing to receive these notifications must register with the delegate object (see "MBean Server Notifications" in this specification.

The "JMImplementation" domain name may be reserved for use by JMX Agent implementations.

E.—Remote Operations on MBeans

Using an appropriate protocol adaptor in the agent, a remote management application will be able to perform operations on the MBeans.

Figure 17:
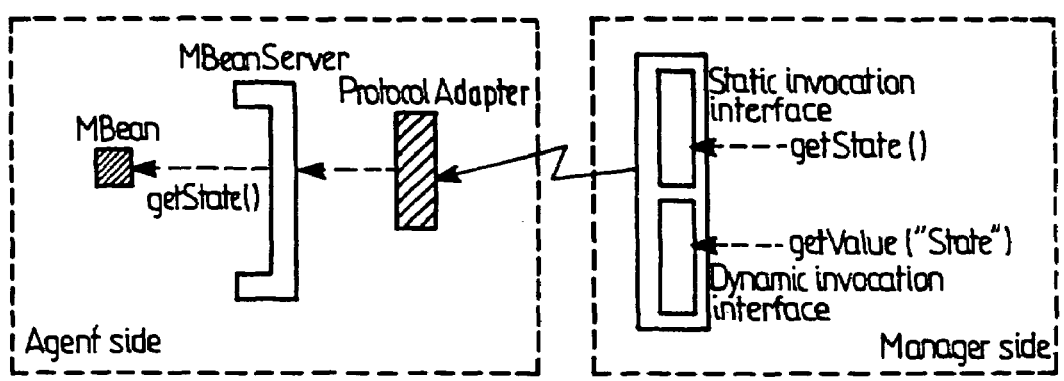
FIG. 17 diagrammatically illustrates the propagation of a remote operation to an MBean.

FIG. 17 shows how a management operation can be propagated from a remote management application to the MBean on the agent side. The example illustrates the propagation of a method for getting the "State" attribute of an MBean, in the following cases:

The management application uses a static invocation interface, typically invoking a getState( ) method on a proxy object (in the case of a Java application).

The management application uses a dynamic invocation interface, invoking a generic getValue( ) method. This type of dynamic invocation is typically used in conjunction with the MBean introspection functionality which allows to discover dynamically, even from a remote JVM, what the properties of a MBean are.

F.—MBean Server Notifications

When specific management operations are performed, the MBeanServer will emit notifications. A specific sub-class of Notification is defined for this purpose: the MBeanServerNotification class which contains a list of object names. The MBean server emits the following two types of notifications:

jmx.mbean.created

This notifications informs of the registration of one or several MBeans. The notification will convey the list of object names of these MBeans.

jmx.mbean.deleted

This notifications informs of the de-registration of one or several MBeans. The notification will convey the list of object names of these MBeans.

In the example, when attributes of registered MBeans change values, this type of notification is handled directly by the MBean, as described in "Attribute Change Notifications" in section B of Exhibit I.2. However, such notifications might also be sent by the MBean server as well.

The MBean server delegate object is in charge of emitting the MBean server notifications. This permits to use the same model for the MBean server notifications as was used for MBean notifications.

By implementing the NotificationListener interface, an event consumer may receive both MBean notifications, and MBeanServer notifications. To register for MBean server notifications, an event consumer will use the same MBean server interface as when registering for MBean notifications, but will provide the name of the MBean server delegate object.

Exhibit IV

```
CODE EXAMPLE CE-1 Constructors of the Simple MBean
public class Simple {
    private Integer state = new Integer (0);
    // Default constructor only accessible from sub-classes
    //
    protected Simple( ) {
    }
    // Public constructor: this class may be considered an MBean
    //
    public Simple (Integer s) {
    state = s;
    }
    ...
}
CODE EXAMPLE CE-2 The "MyClass" MBean definition and associated
"MyClassMBean"
public interface MyClassMBean {
    public Integer getState( );
    public void setState(Integer s);
    public void reset( );
}
public class MyClass implements MyClassMBean {
    private Integer state = null;
    private String hidden = null;
    public Integer getState( ) {
    return(state);
    }
    public void setState(Integer s) {
    state = s;
    }
    public String getHidden( ) {
    return(hidden);
    }
    public void setHidden(String h) {
    hidden = h;
    }
    public void reset( ) {
    state = null;
    hidden = null;
    }
}
```

The invention claimed is:

1. A method of managing a given object in a software management system supporting dynamically manageable objects, comprising the steps of:
   a. creating a dynamically manageable object, in association with the given object, such dynamically manageable object exposing a management interface corresponding to public methods in the given object, wherein said dynamically manageable object comprises a Dynamic Mbean, and
   b. managing the given object through the dynamically manageable object.

2. The method of claim 1, wherein:
   said software management system comprises an MBean-based management system supporting Dynamic Mbeans.

3. The method of claim 1, wherein said given object comprises a non-MBean object.

4. The method of claim 1, wherein step a. comprises accessing the given object to build a list of its public methods.

5. The method of claim 4, wherein said public methods of the given object of step a. comprise attribute-related public methods, determined using naming conventions and whose attributes are defined as readable and/or writable.

6. The method of claim 5, wherein said using naming conventions comprises retrieving the attribute-related public methods of the given object in accordance with design patterns.

7. The method of claim 5, wherein step a. comprises registering the public methods of the given object in data structures.

8. The method of claim 7, wherein step a. comprises defining the data structures as management information classes which contain the public methods of the given object.

9. The method of claim 1, wherein step a. comprises providing a global management information class for exposing public methods of the given object.

10. The method of claim 9, wherein step a. comprises providing a selected public method of the dynamically manageable object to expose the management interface of the given object.

11. The method of claim 10, wherein the selected public method comprises returning the exposed management interface of the given object to the software management system.

12. The method of claim 1, wherein the software management system comprises a managed object server.

13. The method of claim 12, wherein step b. comprises receiving management requests at the managed object server and translating such requests for execution on said given object to be managed.

14. The method of claim 13, wherein the management requests comprise requests for managing the attribute-related public methods of the given object.

15. The method of claim 13, wherein the management requests comprise public methods adapted for writing and returning designated entities to the managed object server.

16. The method of claim 13, wherein the management requests comprise public methods adapted for reading and returning designated entities to the managed object server.

17. A computer system, comprising:
   a processor; and
   a memory coupled to the processor;
   wherein the memory stores software code executable by the processor to implement an object orientated software environment, and wherein the object oriented software environment comprises: an object processor, management functionalities supporting dynamically manageable objects, and a given object, said given object having public methods,
   wherein at least one dynamically manageable object provides public methods, which represent public methods of the given object, exposed in a management interface, for wrapping said given object to render it manageable; and
   wherein said at least one dynamically manageable object is a Dynamic Mbean.

18. The computer system of claim 17, wherein:
   said management functionalities are MBean-based management functionalities supporting Dynamic Mbeans.

19. The computer system of claim 17, wherein said given object comprises a non-MBean object.

20. The computer system of claim 17, wherein the at least one dynamically manageable object is arranged for storing a list of public methods from the given object.

21. The computer system of claim 20, wherein public methods of the given object comprise attribute-related public methods, determined using naming conventions and whose attributes are defined as readable and/or writable.

22. The computer system of claim 21, wherein said naming conventions comprise design patterns for retrieving the attribute-related public methods of the given object.

23. The computer system of claim 21, wherein the public methods of the given object are registrable in data structures.

24. The computer system of claim 23, wherein the data structures comprise management information classes containing the public methods of the given object.

25. The computer system of claim 17, wherein the at least one dynamically manageable object comprises a selected public method to provide a global management information class exposing the public methods of the given object.

26. The computer system of claim 25, wherein the selected public method is capable of exposing the management interface of the given object.

27. The computer system of claim 26, wherein the selected public method is capable of returning the exposed management interface to the management functionalities.

28. The computer system of claim 17, wherein the management functionalities comprise a managed object server.

29. The computer system of claim 28, wherein the managed object server is capable of receiving management requests translated for execution on the given object to be managed.

30. The computer system of claim 29, wherein the management requests comprise requests for managing the attribute-related public methods of the given object.

31. The computer system of claim 29, wherein the management requests comprise public methods adapted for writing and returning designated entities to the managed object server.

32. The computer system of claim 17, wherein the object oriented software environment further comprises an object processor, and at least one manageable object, having public object methods, wherein said manageable object has a management interface, deducible from the object according to a predefined rule.

33. The computer system of claim 32, wherein said predefined rule comprises a naming rule.

34. The computer system of claim 32, wherein said manageable object derives from a class, and said predefined rule comprises a naming rule applied to the class name of the manageable object to designate the corresponding management interface.

35. The computer system of claim 34, wherein said naming rule comprises suffixing the class name in a predefined fashion, with the suffixed name designating a class defining said management interface.

36. The computer system of claim 32, wherein said public methods comprise accessor methods for reading and/or writing attributes.

37. The computer system of claim 36, wherein the attributes and accessor methods correspond to each other in accordance with lexical design pattern rules.

38. The computer system of claim 29, wherein the management requests comprise public methods adapted for reading and returning designated entities to the managed object server.

39. The computer system of claim 28, wherein the managed object server is capable of registering objects having a management interface, for serving management applications.

40. The computer system of claim 39, wherein the object oriented software environment further comprises at least one link for a management application.

41. The computer system of claim 39, wherein the software code is further executable to implement a virtual machine for hosting said object oriented software environment and said management applications.

42. A computing system comprising a plurality of interconnected computers on a network, wherein at least one of the computers is a computer system in accordance with claim 17.

43. A computer readable storage medium storing software code executable to implement managing a given object in a software management system supporting dynamically manageable objects, said managing comprising the steps of:
  a. creating a dynamically manageable object, in association with the given object, such dynamically manageable object exposing a management interface corresponding to public methods in the given object, wherein said dynamically manageable object comprises a Dynamic Mbean, and
  b. managing the given object through the dynamically manageable object.

44. The storage medium of claim 43, wherein said given object comprises a non-MBean object.

45. The storage medium of claim 43, wherein the dynamically manageable object of step a. comprises a constructor which takes as parameter the given object.

46. The storage medium of claim 43, wherein step a. comprises accessing the given object to build a list of its public methods.

47. The storage medium of claim 46, wherein said public methods of step a. comprise attribute reading and/or writing public methods, determined using naming conventions.

48. The storage medium of claim 47, wherein said naming conventions of step a. comprise design patterns for retrieving attribute-related public methods of the given object.

49. The storage medium of claim 47, wherein step a. comprises registering the attribute-related public methods in data structures.

50. The storage medium of claim 49, wherein step a. comprises providing the data structures defined as management information classes which contain the attribute-related public methods of the given object, thus rendering them manageable.

* * * * *